(12) United States Patent
Jordan et al.

(10) Patent No.: US 7,099,935 B2
(45) Date of Patent: Aug. 29, 2006

(54) DYNAMICALLY DETERMINING WHETHER TO PROCESS REQUESTS SYNCHRONOUSLY OR ASYNCHRONOUSLY

(75) Inventors: Michael J. Jordan, Hurley, NY (US); Gary M. King, Millbrook, NY (US); Georgette L. Kurdt, Wappingers Falls, NY (US); Catherine M. Moxey, Newbury (GB); Jeffrey M. Nick, West Park, NY (US); Kelly B. Pushong, Highland, NY (US); Kenneth G. Rothwell, Red Hook, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/968,185

(22) Filed: Oct. 1, 2001

(65) Prior Publication Data

US 2003/0065709 A1   Apr. 3, 2003

(51) Int. Cl.
    *G06F 15/173* (2006.01)
(52) U.S. Cl. .................. 709/223; 709/202; 709/203; 709/224; 709/238; 370/241; 370/252; 370/254; 370/276
(58) Field of Classification Search ............ 709/201, 709/202, 203, 223, 224, 238; 370/241, 252, 370/254–255, 276
    See application file for complete search history.

(56) References Cited

U.S. PATENT DOCUMENTS

| | | | |
|---|---|---|---|
| 4,569,017 A | 2/1986 | Renner et al. | 364/200 |
| 4,674,036 A | 6/1987 | Conforti | 364/200 |
| 5,065,397 A | 11/1991 | Shiobara | 370/85.5 |
| 5,271,000 A | 12/1993 | Engbersen et al. | 370/13 |
| 5,317,739 A | 5/1994 | Elko et al. | 395/650 |
| 5,331,673 A | 7/1994 | Elko et al. | 395/575 |
| 5,339,405 A | 8/1994 | Elko et al. | 395/575 |
| 5,339,427 A | 8/1994 | Elko et al. | 395/725 |
| 5,343,461 A | 8/1994 | Barton et al. | 370/13 |
| 5,392,397 A | 2/1995 | Elko et al. | 395/200 |
| 5,398,331 A | 3/1995 | Huang et al. | 395/575 |
| 5,434,975 A | 7/1995 | Allen | 395/200 |
| 5,450,590 A | 9/1995 | Elko et al. | 395/700 |
| 5,457,793 A | 10/1995 | Elko et al. | 395/600 |
| 5,463,736 A | 10/1995 | Elko et al. | 395/848 |

(Continued)

FOREIGN PATENT DOCUMENTS

EP         817095        1/1998

(Continued)

OTHER PUBLICATIONS

Chalmtac et al., "Performance Models of Asynchronous Multitrunk HYPERchannel Networks," *IEEE Trans. on Computers*, vol. C-36, No. 2, pp. 138-146, Feb. 1987 (Abstract Only).

(Continued)

*Primary Examiner*—Saleh Najjar
*Assistant Examiner*—Shawki Ismail
(74) *Attorney, Agent, or Firm*—Eugene I. Shkurko, Esq.; Blanche E. Schiller, Esq.; Heslin Rothenberg Farley & Mesiti P.C.

(57) ABSTRACT

Heuristics are employed to dynamically determine whether a given request is to be driven synchronously or asynchronously. The average synchronous service time associated with previously processed requests is monitored and used, in real-time, along with other information, to determine whether the given request is to be driven synchronously or asynchronously.

84 Claims, 10 Drawing Sheets

U.S. PATENT DOCUMENTS

| | | | | |
|---|---|---|---|---|
| 5,465,359 | A | 11/1995 | Allen et al. | 395/700 |
| 5,493,668 | A | 2/1996 | Elko et al. | 395/457 |
| 5,515,499 | A | 5/1996 | Allen et al. | 395/182.03 |
| 5,537,574 | A | 7/1996 | Elko et al. | 395/468 |
| 5,561,809 | A | 10/1996 | Elko et al. | 395/800 |
| 5,572,678 | A * | 11/1996 | Homma et al. | 709/227 |
| 5,574,849 | A | 11/1996 | Sonnier et al. | 395/182.1 |
| 5,574,945 | A | 11/1996 | Elko et al. | 395/825 |
| 5,581,737 | A | 12/1996 | Dahlen et al. | 395/497.01 |
| 5,604,863 | A | 2/1997 | Allen et al. | 395/182.09 |
| 5,608,865 | A | 3/1997 | Midgely et al. | 395/180 |
| 5,630,050 | A | 5/1997 | Neuhard et al. | 395/183.03 |
| 5,634,072 | A | 5/1997 | Allen et al. | 396/674 |
| 5,664,155 | A | 9/1997 | Elko et al. | 711/170 |
| 5,689,689 | A | 11/1997 | Meyers et al. | 395/553 |
| 5,706,432 | A | 1/1998 | Elko et al. | 395/200.08 |
| 5,712,856 | A | 1/1998 | Finney et al. | 371/20.1 |
| 5,737,600 | A | 4/1998 | Geiner et al. | 395/616 |
| 5,742,830 | A | 4/1998 | Elko et al. | 395/728 |
| 5,751,955 | A | 5/1998 | Sonnier et al. | 395/200.19 |
| 5,761,739 | A | 6/1998 | Elko et al. | 711/171 |
| 5,790,776 | A | 8/1998 | Sonnier et al. | 395/189.08 |
| 5,860,115 | A | 1/1999 | Neuhard et al. | 711/147 |
| 5,881,238 | A | 3/1999 | Aman et al. | 395/200.56 |
| 5,887,135 | A | 3/1999 | Dahlen et al. | 395/200.8 |
| 5,892,970 | A | 4/1999 | Hagersten | 395/825 |
| 5,923,890 | A * | 7/1999 | Kubala et al. | 712/1 |
| 5,948,060 | A | 9/1999 | Gregg et al. | 709/212 |
| 5,982,873 | A * | 11/1999 | Flockhart et al. | 379/266.02 |
| 6,061,807 | A | 5/2000 | Albert et al. | 714/3 |
| 6,080,203 | A | 6/2000 | Njinda et al. | 716/4 |
| 6,158,031 | A | 12/2000 | Mack et al. | 714/724 |
| 6,178,421 | B1 | 1/2001 | Dahlen et al. | 707/8 |
| 6,230,243 | B1 | 5/2001 | Elko et al. | 711/130 |
| 6,233,644 | B1 | 5/2001 | Dahlen et al. | 710/200 |
| 6,324,570 | B1 * | 11/2001 | Tonchev et al. | 709/207 |
| 6,377,972 | B1 * | 4/2002 | Guo et al. | 709/201 |
| 6,378,052 | B1 * | 4/2002 | Genduso et al. | 711/158 |
| 6,412,049 | B1 * | 6/2002 | Baxter et al. | 711/158 |
| 6,442,594 | B1 * | 8/2002 | Ouchi | 709/206 |
| 6,477,522 | B1 * | 11/2002 | Young | 707/2 |
| 6,775,242 | B1 * | 8/2004 | Grilli et al. | 370/252 |
| 6,779,180 | B1 * | 8/2004 | Palm | 718/100 |
| 6,822,754 | B1 * | 11/2004 | Shiohara | 358/1.15 |

FOREIGN PATENT DOCUMENTS

| | | |
|---|---|---|
| EP | 950954 | 10/1999 |
| FR | 2404970 | 6/1979 |
| JP | 62-185424 A | 8/1987 |
| WO | WO9423367 | 10/1994 |

OTHER PUBLICATIONS

Thierer, M., "Reliability and Monitoring of Computer Controlled Arrangements,", Fernmelde-Praxis, vol. 51, No. 14, pp. 573-591, Jul. 24, 1991 (Abstract Only).

Elko et al., "Coupling Facility Serviceability-Event Notification of Link-Incident Records and Error Reporting", IBM Technical Disclosure Bulletin, vol. 38, No. 4, Apr. 95, p. 173-181.

* cited by examiner

DYNAMICALLY DETERMINING WHETHER TO PROCESS REQUESTS SYNCHRONOUSLY OR ASYNCHRONOUSLY

CROSS-REFERENCE TO RELATED APPLICATIONS/PATENTS

This application contains subject matter which is related to the subject matter of the following applications/patents, each of which is assigned to the same assignee as this application. Each of the below listed applications/patents is hereby incorporated herein by reference in its entirety:

"TEST TOOL AND METHOD FOR FACILITATING TESTING OF DUPLEXED COMPUTER FUNCTIONS", Jones et al., U.S. Pat. No. 6,910,158 B2, issued Jun. 21, 2005;

"RESTARTING A COUPLING FACILITY COMMAND USING A TOKEN FROM ANOTHER COUPLING FACILITY COMMAND", Elko et al., U.S. Pat. No. 6,818,726 B2, issued Nov. 2, 2004;

"COUPLING OF A PLURALITY OF COUPLING FACILITIES USING PEER LINKS", Brooks et al., U.S. Pat. No. 6,954,817 B2; issued Oct. 11, 2005;

"MANAGING THE STATE OF COUPLING FACILITY STRUCTURES", Elko et al., Ser. No. 09/968,248, filed Oct. 1, 2001;

"SYNCHRONIZING PROCESSING OF COMMANDS INVOKED AGAINST DUPLEXED COUPLING FACILITY STRUCTURES", Elko et al., U.S. Pat. No. 6,859,866 B2, issued Feb. 22, 2005;

"SYSTEM-MANAGED DUPLEXING OF COUPLING FACILITY STRUCTURES", Allen et al., U.S. Pat. No. 6,944,787 B2, issued Sep. 13, 2005;

"METHOD, SYSTEM AND PROGRAM PRODUCTS FOR PROVIDING USER-MANAGED DUPLEXING OF COUPLING FACILITY CACHE STRUCTURES", Elko et al., U.S. Pat. No. 6,539,495, issued Mar. 25, 2003;

"CASTOUT PROCESSING FOR DUPLEXED CACHE STRUCTURES", Elko et al., U.S. Pat. No. 6,438,654, issued Aug. 20, 2002;

"SYSTEM-MANAGED REBUILD OF COUPLING FACILITY STRUCTURES", Allen et al., U.S. Pat. No. 6,266,783, issued Jul. 24, 2001;

"METHOD, SYSTEM AND PROGRAM PRODUCTS FOR COPYING COUPLING FACILITY STRUCTURES", Allen et al., U.S. Pat. No. 6,609,214, issued Aug. 19, 2003;

"METHOD, SYSTEM AND PROGRAM PRODUCTS FOR MODIFYING COUPLING FACILITY STRUCTURES", Dahlen et al., U.S. Pat. No. 6,594,667, issued Jul. 15, 2003;

"DIRECTED ALLOCATION OF COUPLING FACILITY STRUCTURES", Dahlen et al., U.S. Pat. No. 6,584,554, issued Jun. 24, 2003;

"METHOD, SYSTEM AND PROGRAM PRODUCTS FOR COPYING COUPLING FACILITY LOCK STRUCTURES", Allen et al., U.S. Pat. No. 6,545,414, issued Apr. 8, 2003;

"METHOD OF CONTROLLING THE FLOW OF INFORMATION BETWEEN SENDERS AND RECEIVERS ACROSS LINKS BEING USED AS CHANNELS", Gregg et al. U.S. Pat. No. 6,681,254, issued Jan. 20, 2004;

"SYSTEM OF CONTROLLING THE FLOW OF INFORMATION BETWEEN SENDERS AND RECEIVERS ACROSS LINKS BEING USED AS CHANNELS", Gregg et al. U.S. Pat. No. 6,051,995, issued Apr. 18, 2000;

"SYSTEM OF PERFORMING PARALLEL CLEANUP OF SEGMENTS OF A LOCK STRUCTURE LOCATED WITHIN A COUPLING FACILITY", Dahlen et al., U.S. Pat. No. 6,233,644 B1, issued May 15, 2001;

"MULTI CHANNEL INTER-PROCESSOR COUPLING FACILITY PROCESSING RECEIVED COMMANDS STORED IN MEMORY ABSENT STATUS ERROR OF CHANNELS", Elko et al., U.S. Pat. No. 5,574,945, issued Nov. 12, 1996;

"METHOD, SYSTEM AND PROGRAM PRODUCTS FOR MANAGING CHANGED DATA OF CASTOUT CLASSES", Elko et al., U.S. Pat. No. 6,230,243 B1, issued May 8, 2001;

"METHOD AND SYSTEM FOR CAPTURING AND CONTROLLING ACCESS TO INFORMATION IN A COUPLING FACILITY", Neuhard et al., U.S. Pat. No. 5,630,050, issued May 13, 1997;

"DYNAMICALLY ASSIGNING A DUMP SPACE IN A SHARED DATA FACILITY TO RECEIVE DUMPING INFORMATION TO BE CAPTURED", Elko et al., U.S. Pat. No. 5,664,155, issued Sep. 2, 1997;

"METHOD AND APPARATUS FOR DISTRIBUTED LOCKING OF SHARED DATA, EMPLOYING A CENTRAL COUPLING FACILITY", Elko et al., U.S. Pat. No. 5,339,427, issued Aug. 16, 1994;

"METHOD AND SYSTEM FOR LOG MANAGEMENT IN A COUPLED DATA PROCESSING SYSTEM", Geiner et al., U.S. Pat. No. 5,737,600, issued Apr. 7, 1998;

"METHOD OF PERFORMING PARALLEL CLEANUP OF SEGMENTS OF A LOCK STRUCTURE", Dahlen et al., U.S. Pat. No. 6,178,421 B1, issued Jan. 23, 2001;

"SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS", Gregg et al., U.S. Pat. No. 5,948,060, issued Sep. 7, 1999;

"METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY", Allen et al., U.S. Pat. No. 5,634,072, issued May 27, 1997;

"METHOD AND APPARATUS FOR OPTIMIZING THE HANDLING OF SYNCHRONOUS REQUESTS TO A COUPLING FACILITY IN A SYSPLEX CONFIGURATION", Kubala et al., U.S. Pat. No. 5,923,890, issued Jul. 13, 1999;

"METHOD FOR RECEIVING MESSAGES AT A COUPLING FACILITY", Elko et al., U.S. Pat. No. 5,706,432, issued Jan. 6, 1998;

"COMMAND EXECUTION SYSTEM FOR USING FIRST AND SECOND COMMANDS TO RESERVE AND STORE SECOND COMMAND RELATED STATUS INFORMATION IN MEMORY PORTION RESPECTIVELY", Elko et al., U.S. Pat. No. 5,392,397, issued Feb. 21, 1995;

"SOFTWARE CACHE MANAGEMENT OF A SHARED ELECTRONIC STORE IN A SUPPLEX", Elko et al., U.S. Pat. No. 5,457,793, issued Oct. 10, 1995;

"REQUESTING A DUMP OF INFORMATION STORED WITHIN A COUPLING FACILITY, IN WHICH THE DUMP INCLUDES SERVICEABILITY INFORMATION FROM AN OPERATING SYSTEM THAT LOST COMMUNICATION WITH THE COUPLING FACILITY", Neuhard et al, U.S. Pat. No. 5,860,115, issued Jan. 12, 1999;

"AUTHORIZATION METHOD FOR CONDITIONAL COMMAND EXECUTION", Elko et al, U.S. Pat. No. 5,450,590, issued Sep. 12, 1995;

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", Elko et al., U.S. Pat. No. 5,561,809, issued Oct. 1, 1996;

"COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF", Elko et al., U.S. Pat. No. 5,463,736, issued Oct. 31, 1995;

"METHOD AND SYSTEM FOR MANAGING DATA AND USERS OF DATA IN A DATA PROCESSING SYSTEM", Allen et al., U.S. Pat. No. 5,465,359, issued Nov. 7, 1995;

"METHODS AND SYSTEMS FOR CREATING A STORAGE DUMP WITHIN A COUPLING FACILITY OF A MULTISYSTEM ENVIRONMENT", Elko et al., U.S. Pat. No. 5,761,739, issued Jun. 2, 1998;

"METHOD AND APPARATUS FOR COUPLING DATA PROCESSING SYSTEMS", Elko et al., U.S. Pat. No. 5,317,739, issued May 31, 1994;

"METHOD AND APPARATUS FOR EXPANSION, CONTRACTION, AND REAPPORTIONMENT OF STRUCTURED EXTERNAL STORAGE STRUCTURES", Dahlen et al., U.S. Pat. No. 5,581,737, issued Dec. 3, 1996;

"SYSPLEX SHARED DATA COHERENCY METHOD", Elko et al., U.S. Pat. No. 5,537,574, issued Jul. 16, 1996;

"MULTIPLE PROCESSOR SYSTEM HAVING SOFTWARE FOR SELECTING SHARED CACHE ENTRIES ON AN ASSOCIATED CASTOUT CLASS FOR TRANSFER TO A DASD WITH ONE I/O OPERATION", Elko et al., U.S. Pat. No. 5,493,668, issued Feb. 20, 1996;

"INTEGRITY OF DATA OBJECTS USED TO MAINTAIN STATE INFORMATION FOR SHARED DATA AT A LOCAL COMPLEX", Elko et al., U.S. Pat. No. 5,331,673, issued Jul. 19, 1994;

"COMMAND QUIESCE FUNCTION", Elko et al., U.S. Pat. No. 5,339,405, issued Aug. 16, 1994;

"METHOD AND APPARATUS FOR PERFORMING CONDITIONAL OPERATIONS ON EXTERNALLY SHARED DATA", Elko et al., U.S. Pat. No. 5,742,830, issued Apr. 21, 1998;

"METHOD AND SYSTEM FOR RECONFIGURING A STORAGE STRUCTURE WITHIN A STRUCTURE PROCESSING FACILITY", Allen et al., U.S. Pat. No. 5,515,499, issued May 7, 1996;

"METHOD FOR COORDINATING EXECUTING PROGRAMS IN A DATA PROCESSING SYSTEM", Allen et al., U.S. Pat. No. 5,604,863, issued Feb. 18, 1997; and "SYSTEM AND METHOD FOR MANAGEMENT OF OBJECT TRANSITIONS IN AN EXTERNAL STORAGE FACILITY ACCESSED BY ONE OR MORE PROCESSORS", Dahlen et al., U.S. Pat. No. 5,887,135, issued Mar. 23, 1999.

TECHNICAL FIELD

This invention relates, in general, to data processing within a distributed computing environment, and in particular, to dynamically determining whether requests within the environment are to be processed synchronously or asynchronously.

BACKGROUND OF THE INVENTION

Some distributed computing environments, such as Parallel Sysplexes, today provide a non-volatile shared storage device called the coupling facility, that includes multiple storage structures of either the cache or list type. These structures provide unique functions for the operating system and middleware products employed for the efficient operation of a Parallel Sysplex. For example, the cache structures provide directory structures and cross-invalidation mechanisms to maintain buffer coherency for multisystem databases, as well as a fast write medium for database updates. These are used by, for instance, the data sharing versions of DB2 and IMS, offered by International Business Machines Corporation, Armonk, N.Y.

The list structures provide many diverse functions. One such list structure function is to provide for high-performance global locking, and this function is exploited by such products as the IMS Resource Lock Manager (IRLM) and the Global Resource Serialization (GRS) function in OS/390, offered by International Business Machines Corporation, Armonk, N.Y. Another list structure function is to provide a message passing mechanism with storage for maintaining multiple messages on a per system basis and a mechanism for notifying a system of the arrival of new messages. This function is exploited by the XCF component of OS/390, which in turn is exploited by numerous multisystem applications for providing a capability to pass messages between their various instances. A third list structure function is to provide for shared queue structures that can be ordered and accessed by LIFO/FIFO ordering, by key, or by name. Workload Manager (WLM), IMS Shared Message Queues and MQ Series, all offered by International Business Machines Corporation, Armonk, N.Y., are examples of exploiters of this feature. While these functions provide examples of the list structure uses, other uses exist.

Various components of a Parallel Sysplex have been documented in numerous applications/patents, which are listed above and hereby incorporated herein by reference in their entirety. The capabilities defined in some of those patents provide the basic system structure to create and manage cache and list structure instances. Additionally, various of the applications/patents listed above provide extensions to the base functions of the Parallel Sysplex.

Some coupling facility requests can be executed in a synchronous manner or an asynchronous manner. Often, executing a coupling facility request in a CPU-synchronous manner (where the issuing CPU waits for the completion of the synchronous request to the coupling facility) is the most efficient way to process a coupling facility request. Doing so avoids certain undesirable aspects of CPU-asynchronous execution of a coupling facility request, such as: the overhead of processor context-switching (giving up the CPU to another process or unit of work, while the coupling facility request executes asynchronously), overhead of back-end completion processing of system request blocks (SRBs) for the asynchronous request, and latencies associated with the asynchronous nature of the request itself.

However, there are exceptions to this general rule. When a synchronous request takes a long time to complete, for whatever reason, there is a high "opportunity cost" associated with processor cycles on the issuing CPU being wasted, while waiting for the completion of that synchronous request. At some threshold point, in terms of synchronous service time for a request, there is a tradeoff between the cost of driving the request synchronously versus the cost of driving the request asynchronously—shorter synchronous service times favor synchronous execution, longer synchronous service times favor asynchronous execution.

If synchronous coupling facility service times were easily predictable, then simple "rules of thumb" and static tables would suffice to make this tradeoff reasonably well. However, in practice, coupling facility service times vary in response to many factors, including, for instance: workload peaks and valleys, distance between the Central Electronic Complex (CEC) where the operating system is running and the coupling facility, number and type of coupling facility links, amount of data transfer, whether or not the request is duplexed, what type of coupling facility request it is, the machine type of the coupling facility, the number of processors on the coupling facility, whether those coupling facility processors are shared or dedicated, and if shared, how much processing weight is assigned to the coupling facility image, and so on. Furthermore, many of these factors that influence the synchronous coupling facility request service time can change dynamically, so that a coupling facility that is providing good synchronous service time at one moment may provide poor service time at a later point in time, or vice versa. Thus, the rules of thumb and static tables have proven inadequate in determining whether a request is to be processed synchronously or asynchronously.

Based on the foregoing, a need exists for a capability that enables the manner in which a request is to be processed to be determined dynamically. In particular, a need exists for a capability that dynamically determines whether a request is to be processed synchronously or asynchronously. A further need exists for a capability that makes this determination based on observed synchronous service times.

SUMMARY OF THE INVENTION

The shortcomings of the prior art are overcome and additional advantages are provided through the provision of a method of managing the processing of requests. The method includes, for instance, obtaining a request to be processed; and determining whether the request is to be processed synchronously or asynchronously, the determining being based, at least in part, on an observed service time for at least one processed request.

Advantageously, a dynamic capability for determining whether a given request is to be processed synchronously or asynchronously is provided. As one example, this determination is based, at least in part, on observed synchronous service times for one or more previously processed requests.

In one example, the average synchronous service time associated with coupling facility requests is monitored, and used, in real-time, as input to a technique that decides whether to drive a request execution synchronously or asynchronously, based on information about the request itself and currently available information regarding the performance of requests of that same type on the same coupling facility.

Aspects of the present invention advantageously enable CPU overhead associated with synchronous requests (e.g., synchronous coupling facility requests) to be avoided, when the cost is likely to be high based on the expected service time, which is based on observations. The technique can adaptively react to high service times caused by a slow coupling facility, fluctuations in coupling facility workload (e.g., an overloaded coupling facility or channel subsystem), distance (e.g., propagation delays in a Geographically Dispersed Parallel Sysplex (GDPS) environment), protocol delays (e.g., exchange of coupling facility duplexing signals), or any other factors that might influence service time for any reason.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
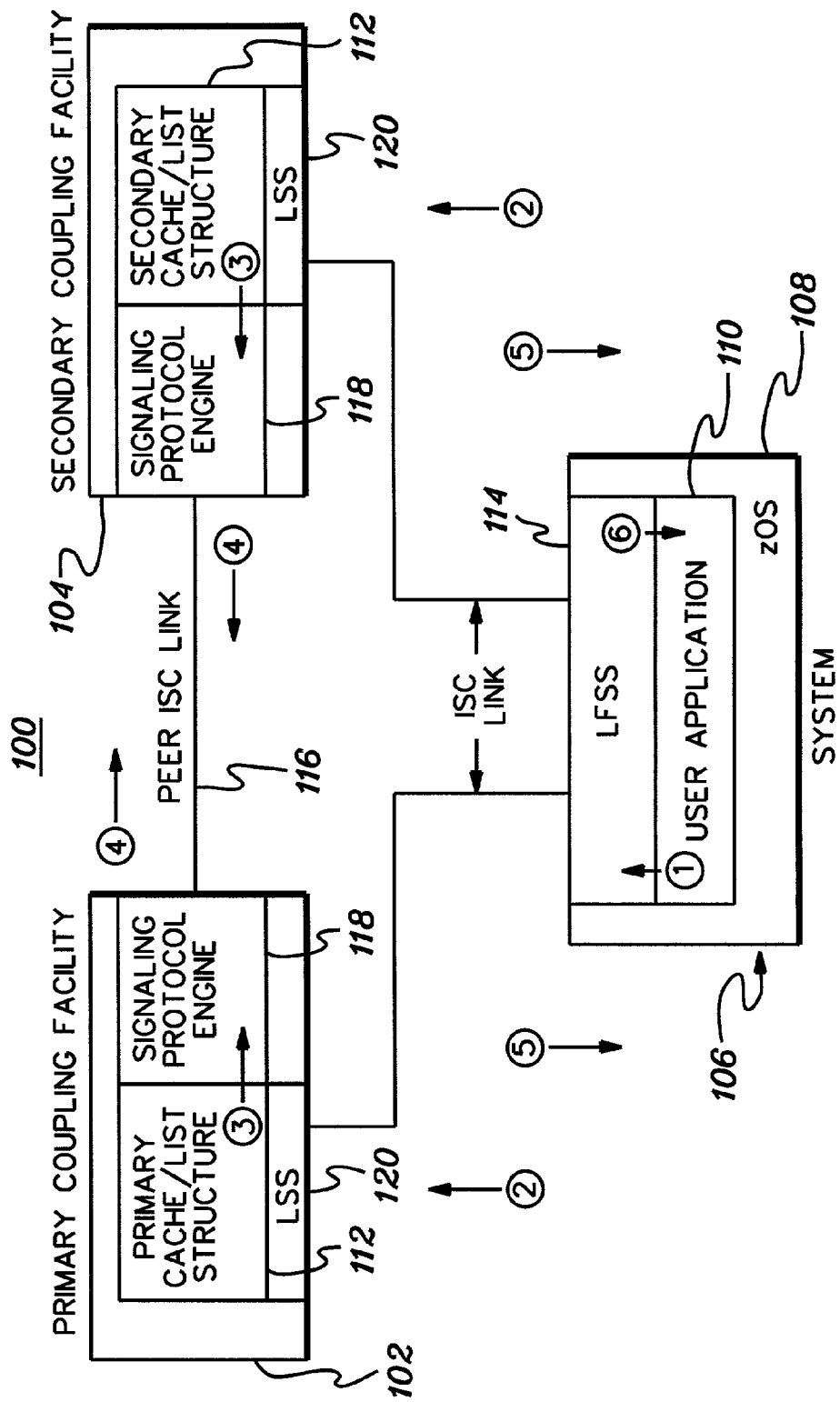
FIG. 1 depicts one embodiment of a computing environment incorporating and using one or more aspects of the present invention.

In one aspect of the present invention, a capability for dynamically determining whether a request is to be processed synchronously or asynchronously is provided. As one example, a dynamic, heuristic conversion of individual coupling facility requests from synchronous to asynchronous execution is provided, which is based on actual observed service times for synchronous coupling facility requests, rather than any hard-coded tables or static information. This allows the CPU overhead associated with synchronous coupling facility requests to be avoided, whenever the synchronous cost is likely to be high given the expected synchronous service time, based on these real-time observations. Conversely, it also allows the CPU overhead associated with asynchronous coupling facility requests to be avoided, whenever the synchronous cost is likely to be low given the expected synchronous service time, based on these observations.

In accordance with at least one aspect of the present invention, the system can adaptively and responsively react to high synchronous coupling facility service times caused by an inherently slow coupling facility (e.g., slow processors), temporary fluctuations in coupling facility workload (e.g., an overloaded coupling facility or channel subsystem), distance effects (e.g., propagation delays in a Geographically Dispersed Parallel Sysplex (GDPS) environment), protocol delays (e.g., exchange of coupling facility duplexing signals), or any other factors that might influence synchronous coupling facility request service time for any reason. When synchronous service times elongate to a particular coupling facility for any reason, this elongation is quickly observed, and future requests to that coupling facility are more likely to be processed asynchronously. This in turn optimizes the CPU utilization and throughput in the operating system image that is driving the requests to the coupling facility.

The synchronous coupling facility service time information that is observed is kept as a moving weighted average (moving weighted average synchronous service time, or MWASST) to skew the results in favor of recent history, so that the technique of an aspect of the present invention can react very responsively to any changes in the actual performance and service times a given coupling facility is providing.

Also, this synchronous coupling facility service time information is kept on a coupling facility by coupling facility basis, with granularity by type of command (specifically, both the opcode type, such as list/lock versus cache, and the specific opcode of the command), the amount of data transfer requested on the command, and other special factors such as, for instance, request operands that are likely to strongly influence command execution time. In accordance with an aspect of the present invention, all types of coupling facility requests (e.g., list, cache, and lock structure requests) are eligible to participate in the capabilities described herein.

In one embodiment, once it has been determined for a particular type of coupling facility request that it should be driven asynchronously, then in general, future occurrences of that type of request are driven asynchronously, and not synchronously. This poses the following problem, however: if, in fact, the synchronous coupling facility service time for that type of request improves dynamically at some point in the future, how will this be observed if operations of that type are no longer being driven synchronously? One aspect of the present invention addresses this issue by occasionally sampling synchronous service times, even when the technique indicates that requests of a particular type should, in general, be processed asynchronously. This sampling results from the facility occasionally indicating that a request should be performed synchronously, even when the observed synchronous service times would normally result in asynchronous execution, so that any future improvement in synchronous service time can be observed, if it occurs.

Both simplex and duplexed coupling facility requests may participate in the various aspects of the present invention. A simplex request is a request driven against one coupling facility structure, while a duplexed request is a request split into a plurality of requests and driven against a plurality of coupling facility structures.

Synchronous service time statistics are kept separately for simplex and duplexed requests. Furthermore, for duplexed requests, the statistics are kept separately for each possible connected pair of coupling facilities in which the duplexed structure instances might reside. This reflects the fact that synchronous service times are likely to be qualitatively different for simplex versus duplexed requests (due to coupling facility duplexing protocol overhead); and it reflects the fact that different connected pairs of coupling facilities may have vastly different aggregate performance in processing duplexed requests between them. Averaging these different results together for simplex versus duplex, or for different pairs of duplexed coupling facility structures, would have yielded uninformative and unusable information having disparate synchronous service times. Keeping the statistics separately allows useful heuristic decisions to be made based on this information.

One embodiment of a computing environment incorporating and using one or more aspects of the present invention is depicted in FIG. 1 and described herein.

FIG. 1 depicts one embodiment of a configuration 100, which includes two coupling facilities 102, 104 coupled to a system 106 in a Parallel Sysplex. In one example, the system is running an instance of the z/OS operating system 108, offered by International Business Machines Corporation, Armonk, N.Y. Further, in one example, the system is running an application 110 that is coupled to a coupling facility structure 112 (either of a cache or list type), whose location is not known to the application. The actual physical connection is managed by a Locking Facility Support Services (LFSS) component 114 of the z/OS operating system and commands initiated by the user application flow through the LFSS component.

Two instances of the coupling facility structure are maintained in separate coupling facilities, referred to as the primary coupling facility and the secondary coupling facility. A peer connection 116, such as an Intersystem Channel (ISC) link, couples the two coupling facilities. The peer ISC link can transmit both primary message commands and secondary message commands in either direction. This may be physically represented by either two unidirectional links, one with a sender channel on the primary coupling facility and a receiver channel on the secondary coupling facility, and the second link oppositely configured. This may also be represented by a single physical link where the channel interface in each coupling facility supports both sender and receiver functionality. This latter capability exists in ISC3 links and their variants: ICB3 and IC3, all of which are offered by International Business Machines Corporation, Armonk, N.Y.

The peer ISC link between the coupling facilities is used, for instance, to exchange message path commands on the primary message command interface to configure and couple the two coupling facilities. Once configured and coupled, the peer ISC link is also used to send secondary commands of the list-notification type to exchange signals as part of a signaling protocol for command execution. The sending and receiving of these secondary commands is managed by a coupling facility component called a signaling protocol engine 118. Requests by the cache and list component of the coupling facility for sending and receiving duplexing signals flow through the signaling protocol engine.

One embodiment of the steps in a normal command execution for a coupling facility-to-coupling facility duplexing model are shown in FIG. 1 in numeric sequence that approximates the time sequence of the command. In these steps, various components of the signaling protocol are described. Further details regarding the signaling protocol are described in detail in a co-filed patent application entitled "COUPLING OF A PLURALITY OF COUPLING FACILITIES USING PEER LINKS," Brooks et al., which is hereby incorporated herein by reference in its entirety.

Step 1. The user application generates a command and communicates this command to the LFSS through a system macro interface.

Step 2. The LFSS creates two copies of the command, sending one to the primary coupling facility and the second to the secondary coupling facility. The LFSS uses an asynchronous SEND MESSAGE interface without notification to allow the two commands to be initiated in parallel. The LFSS also sets a synchronous completion on initial status (SCIS) bit of the SEND MESSAGE to minimize the effects of any busy conditions encountered on the channel interface. A link-subsystem (LSS) component 120 of the coupling facility control code (CFCC) in the primary coupling facility receives the command and transfers control to the cache or list component, as appropriate. Likewise, the link-subsystem (LSS) component in the secondary coupling facility receives the command and transfers control to the cache or list component, as appropriate.

Step 3. The cache/list component of the primary coupling facility executes the command to the point where a message response block (MRB) would be returned to the application. But, before sending the MRB and while the internal latches are held for the objects referenced by the command, a request is made to the signaling protocol engine in the primary coupling facility to send a completion signal on the peer ISC link to the secondary coupling facility. Likewise, the cache/list component of the secondary coupling facility executes the command to the point where the MRB would be returned to the application. But, before sending the MRB and while the internal latches are held for the objects referenced by the command, a request is made to the signaling protocol engine in the secondary coupling facility to send a completion signal on the peer ISC link to the primary coupling facility.

Step 4. The signaling protocol engine in the primary coupling facility sends the completion signal to the secondary coupling facility and then waits for the reception of the completion signal from the secondary coupling facility. Likewise, the signaling protocol engine in the secondary coupling facility sends the completion signal to the primary coupling facility and then waits for the reception of the completion signal from the primary coupling facility.

Step 5. When the primary coupling facility recognizes the reception of the completion signal from the secondary coupling facility, the primary coupling facility sends the MRB and releases the latches. Likewise, when the secondary coupling facility recognizes the reception of the completion signal from the primary coupling facility, it also sends the MRB and releases the latches. If a failure occurs during this period of time and either the primary coupling facility or the secondary coupling facility fails to recognize the reception of a completion signal, then duplexing is broken by the coupling facility by, for instance, resetting a duplexing active indicator for the structure.

Step 6. Assuming no errors have occurred, the LFSS receives both MRBs from the two coupling facilities and constructs a single message response block by reconciling the results of the two MRBs and gives this response to the application. If, on the other hand, duplexing has been broken by one of the two coupling facilities, then the operating system invokes failover recovery and one of the two structures is selected as the surviving instance. Once the error is corrected, duplexing can be reestablished.

With the above processing, user transparency is provided because the duplexing functions are performed by the LFSS without awareness by the user application.

Failure isolation is also provided by creating two copies of the structure in separate facilities, each of which can continue as the surviving structure in a situation involving the failure of the other. Further, command atomicity is provided by maintaining latches on both structures until both commands complete.

Performance is optimized in several ways. First, sending the commands in parallel allows for maximum overlap of data transfer and command execution. Second, by exchanging completion signals immediately upon reaching the MRB send point in the command, the completion can be detected with minimal intervening latency. Third, the amount of data sent in the signal itself is small relative to the amount of data sent on the primary link for the command. So, a single peer ISC link can handle the combined signal traffic generated by commands sent on a significant number of primary ISC links. In fact, for small distances, a single ISC link can handle the combined traffic of the commands generated in a 32-system Parallel Sysplex. Fourth, by using list notification as the signaling transport mechanism, the signal can be processed by the receiver channel engine without needing to interrupt the coupling facility control code (CFCC) to process the signal. Fifth, by using the SCIS facility, contention detected by a SEND MESSAGE can be minimized by causing redrives to be performed substantially immediately.

Although in the embodiment described above, an ISC link is used to couple the two coupling facilities, this is only one example. Other links may be used, including, for instance, an ICB or IC link. Further, more than two coupling facilities may be coupled to one another. However, it is not necessary for all coupling facilities to be coupled to each other. For instance, a third coupling facility may be coupled to Coupling Facility 2 via a peer connection, but not to Coupling Facility 1.

In addition to the above, the coupling facilities that are coupled may be in separate Central Processing Complexes (CPC), in separate partitions of one CPC, or a combination thereof. In the situation that the facilities are in separate partitions of one CPC, the same links can be used for both duplexing and command traffic.

In another embodiment, multiple peer links can be configured as redundant connections. In this scenario, the duplexing protocol recognizes a link failure and maintains signal exchanges on surviving links.

In yet further embodiments, other environments may incorporate and use aspects of the present invention, including, for example, other sysplex environments that do not couple the coupling facilities to one another, or other environments that do not support duplexing. Further, aspects of the invention can be incorporated and used in environments that do not have coupling facilities. The above environment is only one example.

Overview of Sync/Async Coupling Facility Request Conversion

Figure 2:
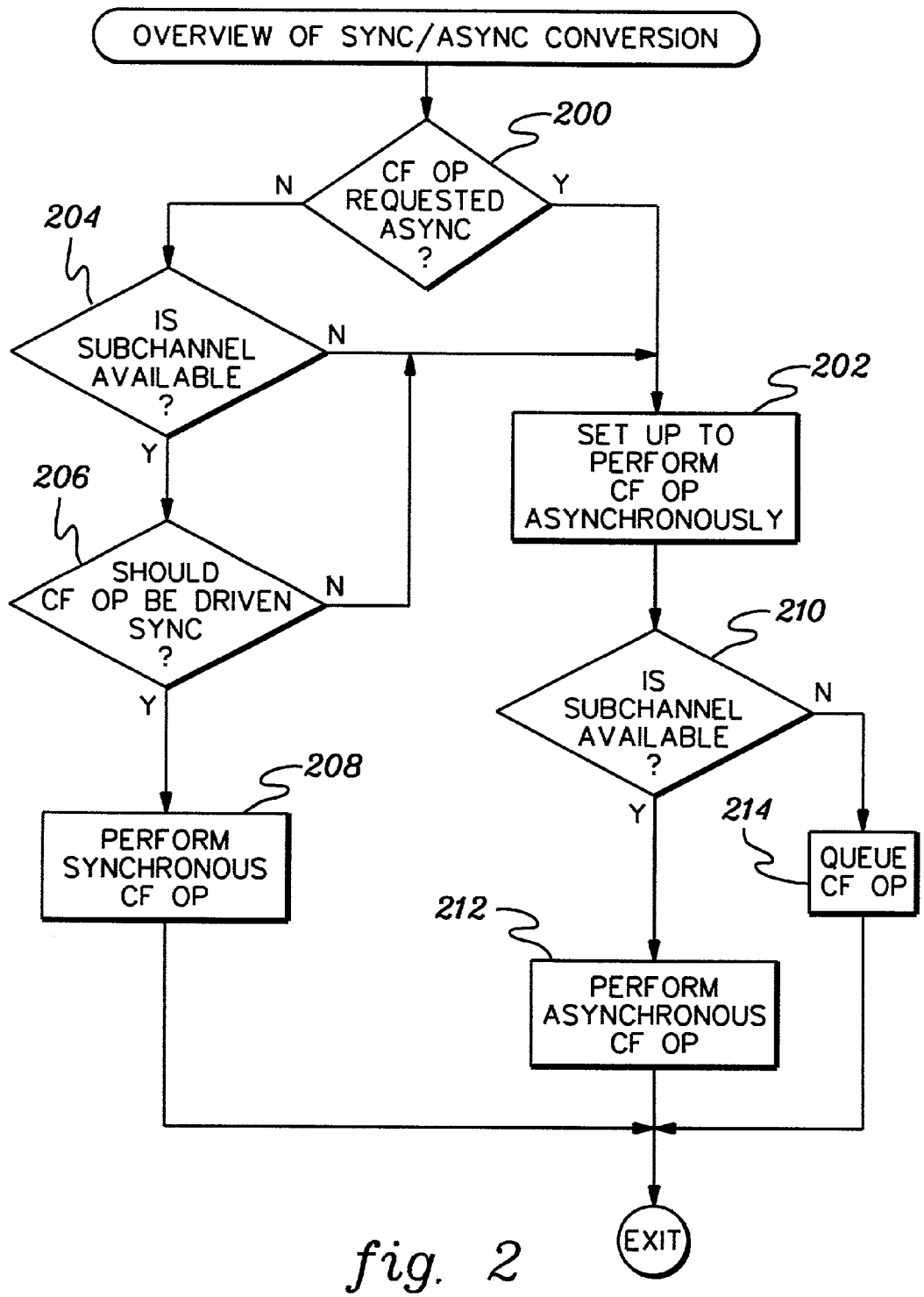
FIG. 2 depicts one embodiment of the logic associated with an overview of the sync/async conversion process, in accordance with an aspect of the present invention.

FIG. 2 depicts one embodiment of the logic associated with an overview of synchronous to asynchronous coupling facility request conversion. Initially, a determination is made as to whether the end user requested the operation to be performed synchronously or asynchronously, INQUIRY 200. As one example, if the end user requested asynchronous execution, then the operation is set up to be performed asynchronously, STEP 202. In general, when an end user requests asynchronous execution in this way, it is because the user wishes to perform other activities (perhaps initiating other coupling facility access requests, or perhaps other non-CF-related activities) in parallel with the coupling facility operation that was requested asynchronously. Thus, if these asynchronous requests were converted to CPU-synchronous execution, then it would run counter to the user's intent to achieve parallelism.

If, on the other hand, the end user requested the coupling facility operation to be performed synchronously, then a further determination is made as to the availability of resources (such as, a subchannel), INQUIRY 204. Should the resources be unavailable to perform the request synchronously, then the request is set up for asynchronous execution, STEP 202. That is, the unavailability of the resources is a secondary reason for converting the request to asynchronous execution.

However, if the resources are available to perform the operation synchronously, then, in accordance with an aspect of the present invention, a determination is made as to whether or not it is desirable, from an overall system perspective, to continue with synchronous execution of this request, INQUIRY 206. One embodiment of the logic associated with this sync/async conversion decision is described hereinafter with reference to FIGS. 5a–5b. Depending on the results of this decision, the request is either set up for asynchronous execution, STEP 202, or it is driven in the requested CPU-synchronous fashion, STEP 208.

If the request is, for whatever reason, set up for asynchronous execution, STEP 202, then a further determination is made as to whether resources (e.g., a subchannel) are available to initiate the request asynchronously, at this time, INQUIRY 210. If so, the coupling facility operation is started asynchronously, STEP 212, and it completes asynchronously through existing mechanisms for completing asynchronous coupling facility operations (embodiments of which are described in one or more of the previously incorporated applications/patents.) If not, then the coupling facility operation is queued for later asynchronous execution, when a subchannel becomes available, STEP 214, again as is known.

Figure 3A:
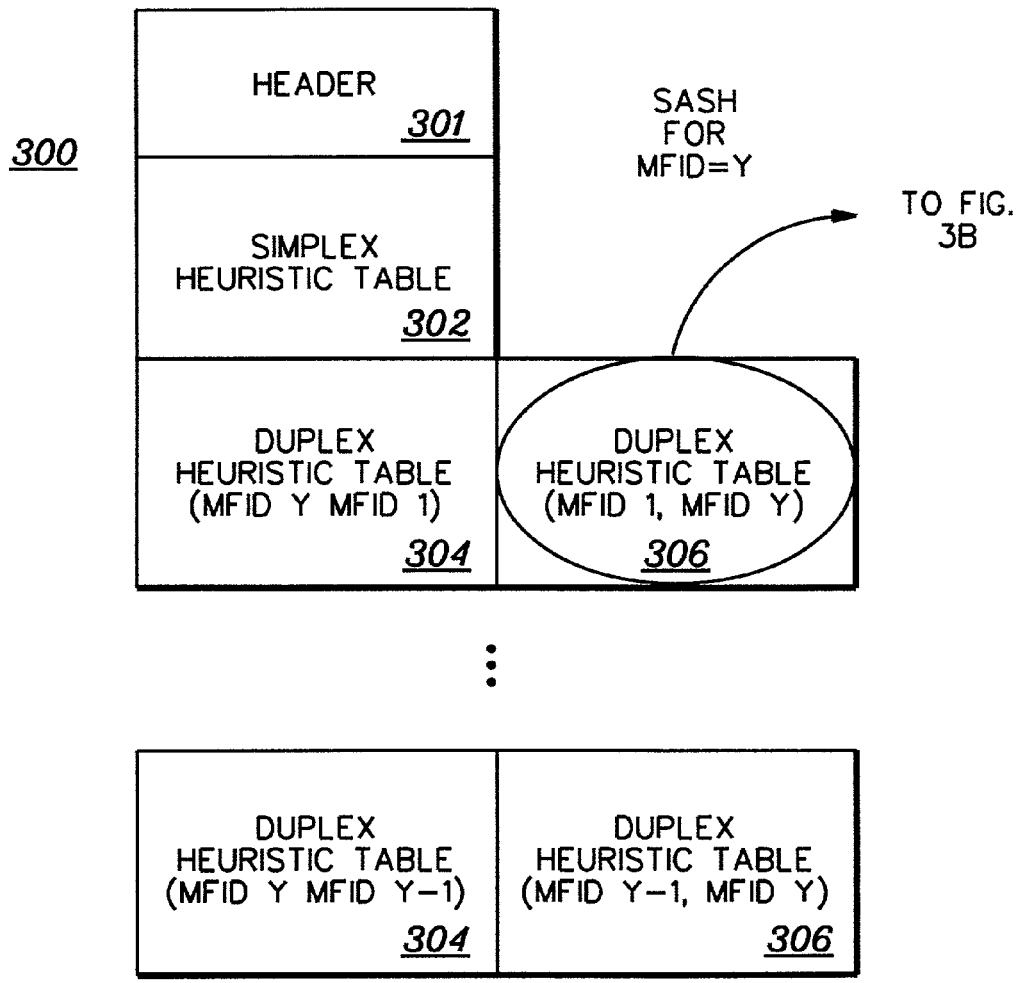
FIGS. 3a–3b depict one example of a data structure, the sync/async heuristic (SASH) structure, used by one or more aspects of the present invention.

Referring again to INQUIRY 206, in one aspect of the present invention, the sync/async heuristic conversion decision employs real-time information about synchronous service times, as input to its decision-making process. This information is maintained in a data structure, such as a sync/async heuristic (SASH) data structure, one embodiment of which is described with reference to FIGS. 3a and 3b. The collection of this information is described in more detail with reference to FIGS. 4a and 4b, and the use of this information in implementing the decision is described in more detail with reference to FIGS. 5a and 5b.

Sync/Async Heuristic (SASH) Table Structure

In accordance with an aspect of the present invention, there is one SASH data structure per coupling facility, that is accessible from the current operating system image. As described below, the SASH structure includes one or more SASH tables, which are initialized as follows: when the coupling facility is accessible at system initialization time, the SASH tables for that coupling facility are initialized at system initialization time. However, when the coupling facility becomes accessible later, the SASH tables for that coupling facility are initialized at the time that the coupling facility becomes accessible. The initialization of the SASH tables is described in more detail with reference to FIG. 6.

For each coupling facility, a SASH structure 300 includes, for instance, a SASH header 301, a simplex SASH table 302, and zero or more pairs of duplex SASH tables 304, 306.

SASH header 301 includes, for instance, global information for the SASH, such as how large the SASH tables are in aggregate, and an indication of the message facility identifier (MFID) of the current coupling facility. The MFID is an existing designation that indexes the coupling facilities accessible to the operating system. For example, the first coupling facility has MFID 1, the second coupling facility has MFID 2, and so forth. The MFID is relevant to the SASH structure because, for a given coupling facility, the MFID of the coupling facility determines how many (and which) duplex SASH tables are to be used. In particular, the SASH structure for the coupling facility with MFID 1 has no duplex SASH tables; the SASH structure for the coupling facility with MFID 2 has 2 duplex SASH tables (one for operations whose primary structure is in coupling facility MFID 1 and whose secondary structure is in coupling facility MFID 2, the other for operations whose primary structure is in coupling facility MFID 2 and whose secondary structure is in coupling facility MFID 1); the SASH table for the coupling facility with MFID 3 has 4 duplex SASH tables (one for operations whose primary structure is in coupling facility MFID 1 and whose secondary structure is in coupling facility MFID 3, another for operations whose primary structure is in coupling facility MFID 3 and whose secondary structure is in coupling facility MFID 1, another for operations whose primary structure is in coupling facility MFID 2 and whose secondary structure is in coupling facility MFID 3, and another for operations whose primary structure is in coupling facility MFID 3 and whose secondary structure is in coupling facility MFID 2); and so on for higher-numbered coupling facility MFIDs.

Each of the individual SASH tables (302, 304, 306) has, in this example, the same internal structure. For instance, each SASH table is a three-dimensional array of cells, as shown in FIG. 3b.

Figure 3B:
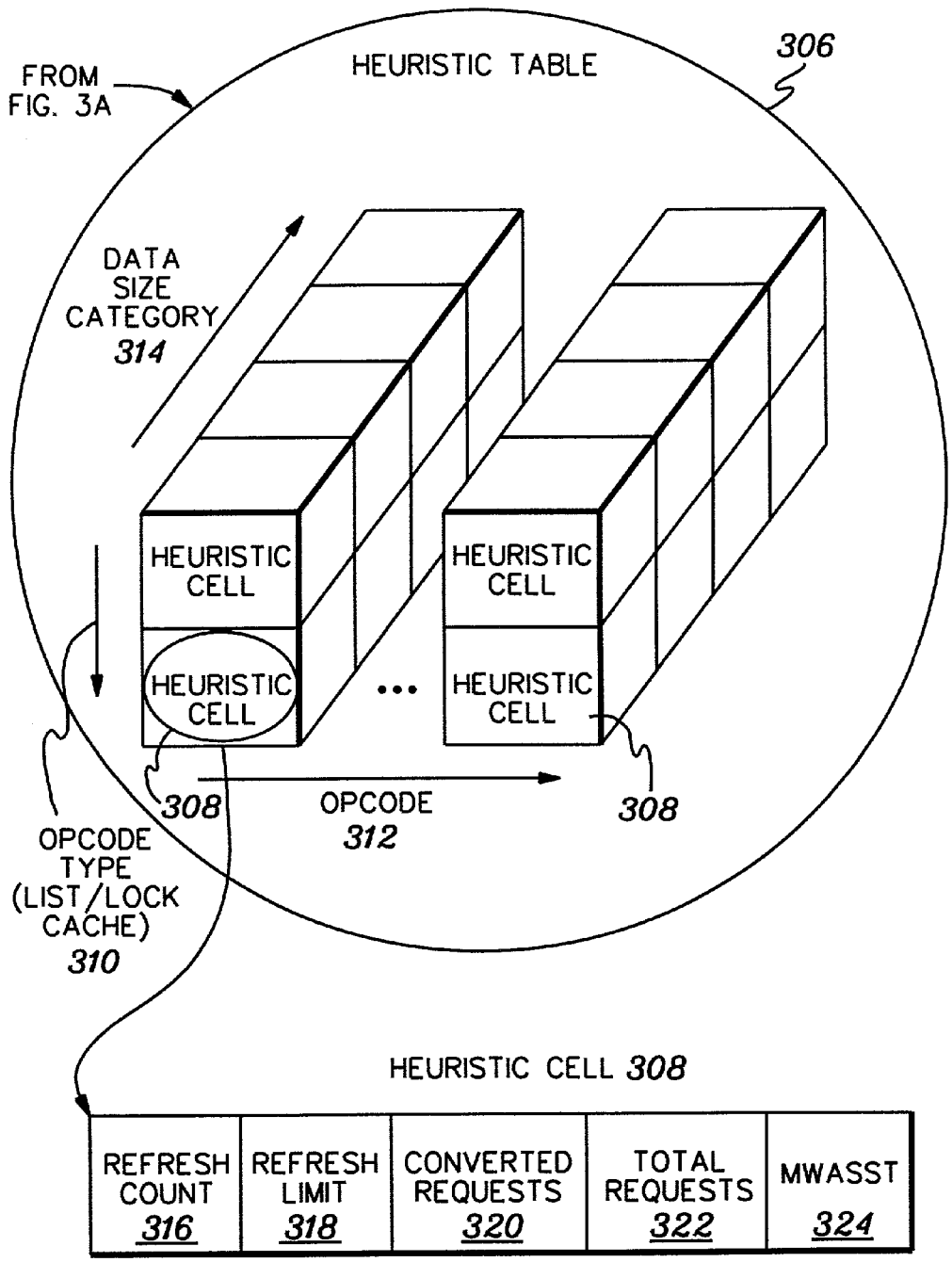

Referring to FIG. 3b, a SASH table, such as SASH table 306, includes a three-dimensional array of cells 308, and the three dimensions of the array include, for example:

1. An opcode type dimension 310, which indicates whether the coupling facility operation is a list/lock structure operation, or a cache structure operation.
2. An opcode dimension 312, which indicates the specific type of coupling facility operation to the structure, such as reading a particular entry, writing a particular entry, or one of the many other specific coupling facility request types. Note that this dimension may also be extended to allow additional room to account for the effects of special operands on a particular type of request. This is described in more detail when SASH table initialization is discussed with reference to FIG. 6. Note also that different request opcodes often have different inherent performance characteristics, making it advantageous to track synchronous service times separately for each opcode.
3. A data transfer size dimension 314, which indicates the total amount of data transfer to/from the coupling facility which accompanies the request. The dimension of this table can be limited by categorizing the amount of data transfer based on the data buffer count for the request, as follows: no data transfer (zero buffers); one data buffer; 2 through 8 data buffers; and 9 through 16 data buffers. Note that many other categorizations of the amount of data transfer are also possible, and do not materially affect the applicability of the present invention. Note also that the amount of data transfer can strongly influence the performance of a coupling facility request, influencing the synchronous service time.

In one embodiment, each cell 308 in each of the tables (302, 304, 306) for a particular coupling facility includes several fields used in making a sync/async heuristic conversion decision. The fields in each cell include, for instance:

1. RefreshCount 316—indicates the number of consecutive requests associated with this cell that have been driven asynchronously by the sync/async heuristic. When the sync/async heuristic performs an operation associated with this cell synchronously, the RefreshCount is reset to zero, when the timing information about the synchronous request is recorded in this cell.
2. RefreshLimit 318—indicates the limit on the number of consecutive requests associated with this cell that may be driven asynchronously by the sync/async heuristic, before one will be "forced" to be driven synchronously. This field is used in conjunction with RefreshCount 316 to ensure that synchronous operations are occasionally performed, so that synchronous service times continue to be monitored, for requests associated with each cell.
3. ConvertedRequests 320—indicates the total count of requests associated with this cell which were converted to asynchronous based on the sync/async heuristic decision.
4. TotalRequests 322—indicates the total count of requests associated with this cell which were eligible to be converted to asynchronous based on the sync/async heuristic decision. In conjunction with the ConvertedRequests field 320, this can be used to determine the percentage of eligible requests associated with a particular cell, which were actually converted to asynchronous execution.
5. MWASST 324—moving weighted average synchronous service time for requests associated with this cell.

The information that is maintained in cells 308 associated with SASH tables 302, 304, 306 is derived from two sources. Some of it is preset at the time that the SASH tables are initialized for a particular coupling facility (as described in more detail with reference to FIG. 6). However, a majority of the information in each SASH table is gathered in real-time as a result of observing the actual performance of synchronous coupling facility operations. The timing of synchronous coupling facility operations, and the recording of the relevant information in SASH cells 308 is further described with reference to FIGS. 4a–4b.

Timing of Synchronous Coupling Facility Operations

Figure 4A:
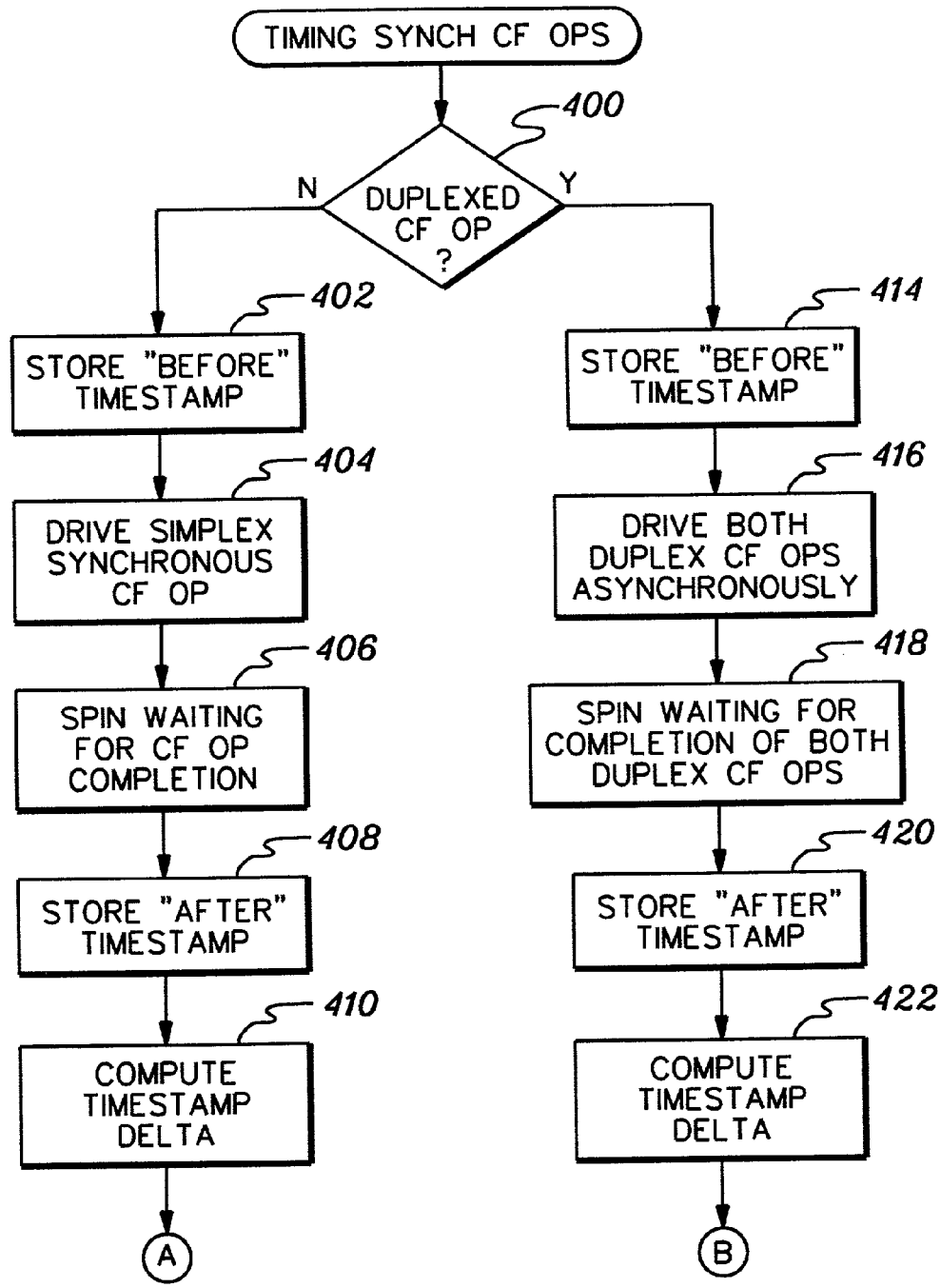
FIGS. 4a–4b depict one embodiment of the logic associated with the timing of synchronous coupling facility operations (both simplex and duplex), and the collection of the relevant timing information in the SASH structure, in accordance with an aspect of the present invention.

Synchronous execution of simplex coupling facility operations and duplexed coupling facility operations are performed, and timed, differently. Thus, initially a decision is made as to whether the synchronous request is simplex or duplexed, INQUIRY 400 (FIG. 4a).

Should the request be a simplex synchronous operation, the execution and timing proceeds, as follows. A "before" timestamp is stored, prior to driving the operation to the coupling facility, STEP 402. The simplex operation is then driven to the target coupling facility, in a CPU-synchronous manner, STEP 404. The operating system then ensures that the coupling facility operation is completed by spinning in a polling loop, without giving up the CPU for use by other processes, until the coupling facility operation is determined to be complete, STEP 406. Once this is known, an "after" timestamp is stored, STEP 408, and a delta between the before and after timestamps is computed to determine the actual observed synchronous service time for the simplex request, STEP 410.

Figure 4B:
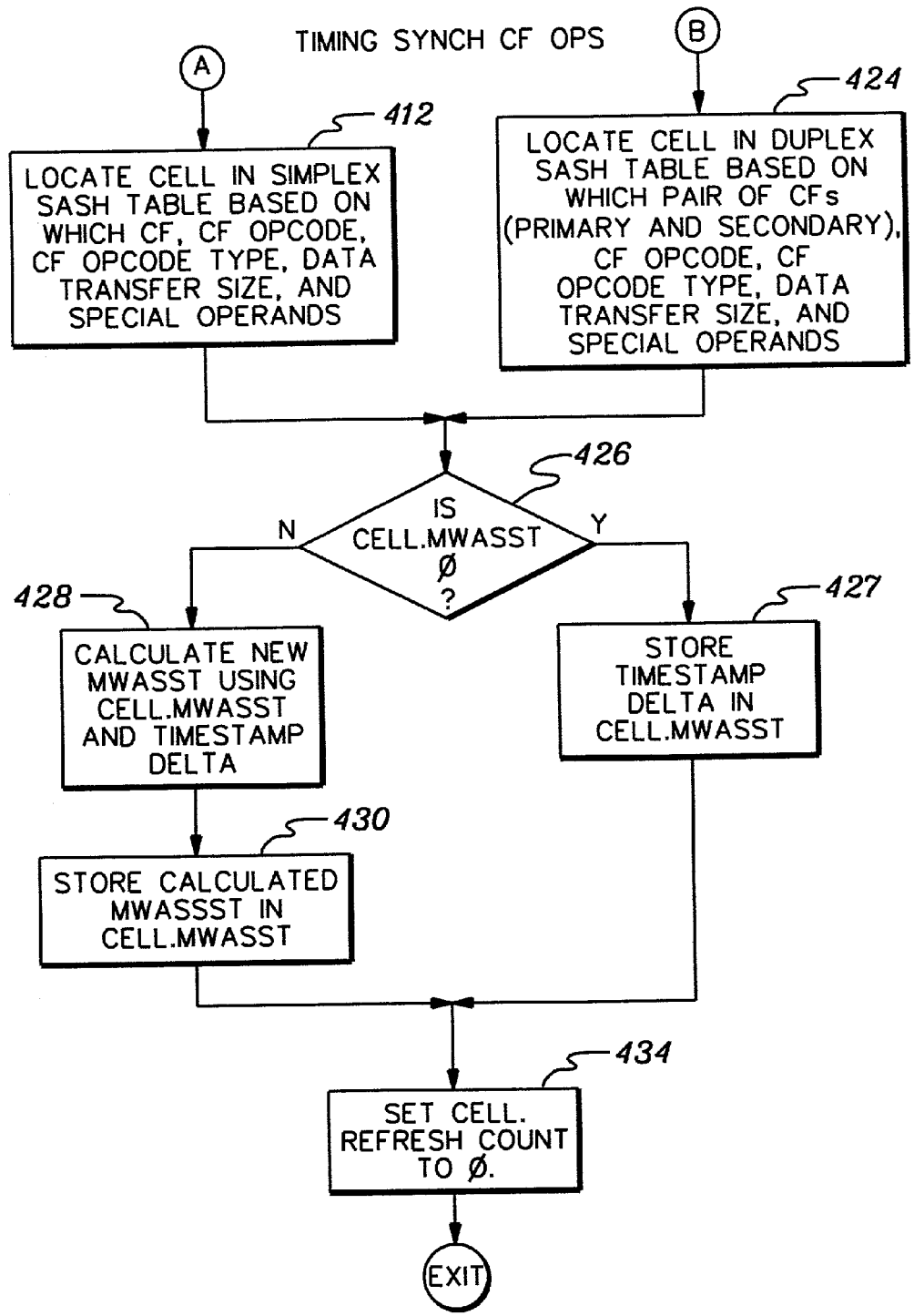

Once the simplex request synchronous service time is known, this information is recorded in the appropriate cell 308 of simplex SASH table 302 for the coupling facility used for this operation, as described below. However, in order to do this, the appropriate cell is located based on the MFID of the coupling facility that was used, the coupling facility request opcode and opcode type, the data transfer size for the coupling facility request, and the presence of any special operands on the request, STEP 412 (FIG. 4b).

Returning to INQUIRY 400 (FIG. 4a), for a duplexed synchronous operation, in one example, the execution and timing proceeds, as follows. A "before" timestamp is stored, prior to driving the pair of duplexed operations to the coupling facilities, STEP 414. The pair of duplexed operations is then driven to the target coupling facilities, in a CPU-asynchronous manner, STEP 416. These operations are launched asynchronously relative to the CPU, so that they can be concurrently launched and execute in parallel at the pair of coupling facilities. The operating system then ensures that both of the coupling facility operations are completed by spinning in a polling loop, without giving up the CPU for use by other processes, until both coupling facility operations are determined to be complete, STEP 418. This makes the duplexed operation, in aggregate, appear to have been processed in a synchronous manner, even though, in reality, each of the requests was processed asynchronously with respect to the issuing CPU. Once the operations are both known to be complete, an "after" timestamp is stored, STEP 420, and a delta between the before and after timestamps is computed to determine the actual observed synchronous service time for the duplexed request, STEP 422.

Once the duplexed request synchronous service time is known, this information is recorded in appropriate cell 308 of the appropriate duplex SASH table 304, 306 for the pair of coupling facilities used as the primary and secondary coupling facilities for this duplexed operation, as described below.

In order to record the information, however, the appropriate cell 308 is located by first locating the appropriate duplex SASH table 304, 306 based on the MFIDs of the two coupling facilities that were used. For example, suppose that a duplexed request is driven to a duplex pair of structures, the primary structure residing in the coupling facility with MFID 2 and the secondary structure residing in the coupling facility with MFID 3. The duplex SASH table for this combination (2,3) is found in the duplex SASH tables associated with the higher-numbered MFID of the pair, MFID 3.

Then, the particular cell is located within that SASH table based on the coupling facility request opcode and opcode type, the data transfer size for the coupling facility request, and the presence of any special operands on the request, STEP 424 (FIG. 4b).

Once the relevant cell has been located, the logic associated with the timing for synchronous coupling facility requests converges into a common flow regardless of whether the request was simplex or duplexed. At this point, a determination is made as to whether the moving weighted average synchronous service time, or MWASST, that is currently recorded in the located cell is zero, INQUIRY 426. If MWASST is zero, then there is no prior knowledge of any synchronous requests for this cell, and thus, there is no need to average the current request's service time in with the prior average service time (which does not exist). Therefore, the current request's service time (e.g., the timestamp delta computed at STEP 422 or STEP 410 (FIG. 4a)) is stored into the MWASST field 324 of the cell, STEP 427.

However, if the MWASST recorded in the cell is not zero, then the current request's service time is averaged with the MWASST information currently recorded in the cell, STEP 428. Any number of different "weighted average" schemes could be used to calculate the moving weighted average of STEP 428, without departing from or detriment to aspects of the present invention. As one example, the following can be used:

New $MWASST=((Cell.MWASST*(N-1))+(Current\ request's\ service\ time))/N$.

The choice of a weighting factor, N, is influenced by the following considerations. N should be a power of 2, so that the calculation can be performed efficiently. N should be large enough to "average out" small and insignificant anomalies in the service time, which may result from transient factors, and yet, N should be small enough to allow responsiveness to any real, persistent change in the synchronous service times that are being observed for the coupling facility requests. A value of 1024 for N is probably a good tradeoff between these considerations, given a reasonably large coupling facility request access rate.

Subsequent to determining the new MWASST, it is stored back into the MWASST field of the cell, STEP 430. In addition to updating the MWASST at either STEP 427 or 430, RefreshCount field 316 in the cell is reset to zero, STEP 434. The RefreshCount is used to ensure that some requests for this cell continue to be "forced" to be driven synchronously, from time to time, in the absence of any ongoing synchronous coupling facility activity for this cell. This allows the sync/async heuristic to continue to observe changes in synchronous coupling facility service times even when most operations for the cell are converted to asynchronous execution. However, as in this case, when operations are being performed synchronously, the RefreshCount is zeroed, since current information about synchronous service time for this cell is already provided.

As described above, SASH tables 302, 304, 306 include information used in making a sync/async heuristic conversion decision for a coupling facility request. One embodiment of the details of this decision-making process is described with reference to FIGS. 5a–5b.

Sync/Async Heuristic Decision-Making Process

Figure 5A:
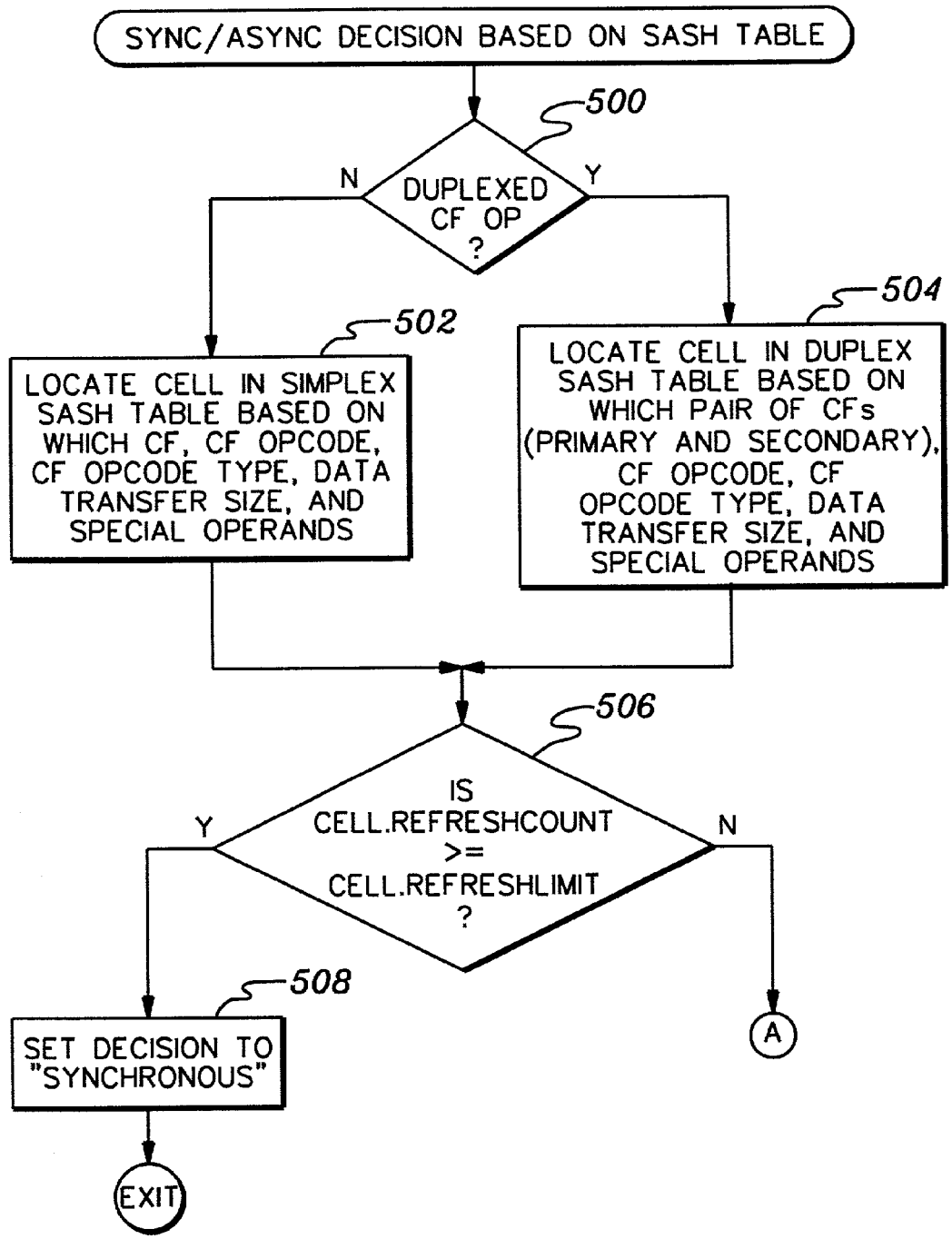
FIGS. 5a–5b depict one embodiment of the logic associated with the sync/async conversion decision-making process for a coupling facility request, using the information included in the SASH structure as input to a decision as to whether the present request should be driven synchronously or asynchronously, in accordance with an aspect of the present invention.

Referring to FIG. 5a, initially, a determination is made as to whether the request under consideration is a simplex or duplexed request, INQUIRY 500. As described above (STEPS 412, 424), this affects how the appropriate SASH table (302, 304, 306) and cell 308 is to be located for the current request. When the request is simplex, the relevant cell in simplex SASH table 302 is located, STEP 502. On the other hand, when the request is duplexed, the relevant duplex SASH table (304, 306) for the pair of coupling facilities containing the primary and secondary structure is used, and the relevant cell within that duplex SASH table is located, STEP 504.

Once the appropriate cell pertaining to the current coupling facility request under consideration has been located, the RefreshCount for that cell is checked, INQUIRY 506. If the RefreshCount is greater than or equal to the RefreshLimit defined for the cell, that implies that enough consecutive coupling facility operations using this cell have been performed asynchronously and thus, it is now time to "force" a request of this type to be driven synchronously again, just to "check on" the synchronous service time that is now being observed. In this case, the heuristic decision is set to "synchronous", STEP 508, and processing exits. Based on this decision, this coupling facility operation is performed synchronously.

However, if the RefreshCount for the cell is less than the RefreshLimit defined for the cell, INQUIRY 506, then a determination is made again as to whether this is a simplex or duplexed coupling facility request, INQUIRY 510. If it is a simplex case, then a determination is made as to the appropriate simplex conversion threshold to use in comparison to the cell's MWASST value, STEP 512. Similarly, if it is a duplex case, then a determination is made as to the appropriate duplex threshold, STEP 514. One embodiment of the logic associated with how these thresholds are determined is discussed hereinafter with reference to FIG. 7.

At this point, the cell's MWASST includes historical information collected over some period of time for requests similar to the current one, which can be inferred to be the "expected" service time of the current request. If this "expected" service time is short, that is, less than the threshold value that was determined (STEPS 512, 514) above, INQUIRY 516, then the heuristic decision is set to "synchronous", STEP 518. Based on this decision, this coupling facility operation is performed synchronously. On the other hand, if this "expected" service time is long, that is, greater than or equal to the threshold value that was determined (STEPS 512, 514) above, INQUIRY 516, then the heuristic decision is set to "asynchronous", STEP 520. Based on this decision, this coupling facility operation is performed asynchronously. When the decision is "asynchronous", the cell's RefreshCount is incremented by 1 to reflect that another consecutive asynchronous operation has been performed, since the last time that a synchronous operation was opted to be peformed for this type of request, STEP 522. Additionally, the cell's ConvertedRequests count is incremented by 1 to maintain statistics on how often this type of request was converted from synchronous to asynchronous execution based on the sync/async conversion heuristic, STEP 524.

In both the synchronous and asynchronous cases, the cell's TotalRequests count is incremented by 1, to serve as a baseline for comparison to the ConvertedRequests count for this cell, STEP 526.

Figure 5B:
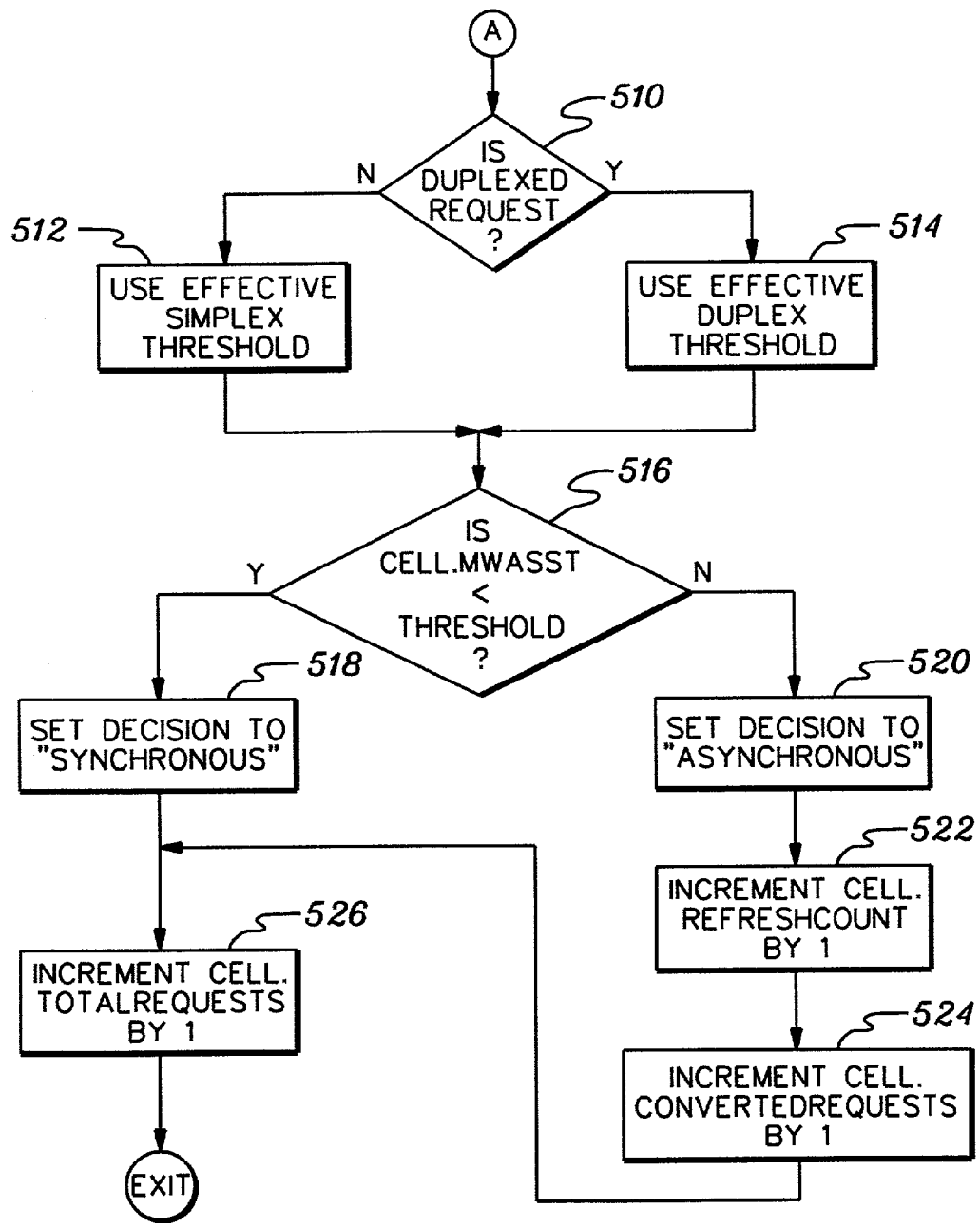

Described in detail above are the SASH tables from the perspective of their overall structure and content (FIGS. 3a–3b), and their usage in timing synchronous coupling facility operations and recording historical information about synchronous service times for different types of coupling facility requests (FIGS. 4a–4b), as well as for later use by the sync/async heuristic decision-making process in determining whether to drive a particular coupling facility operation synchronously or asynchronously (FIGS. 5a–5b). Described below is one embodiment of the processing employed to create/initialize the SASH tables, and the processing to determine what values to use as the sync/async conversion thresholds for both simplex and duplexed requests.

Sync/Async Heuristic (SASH) Structure Initialization

Figure 6:
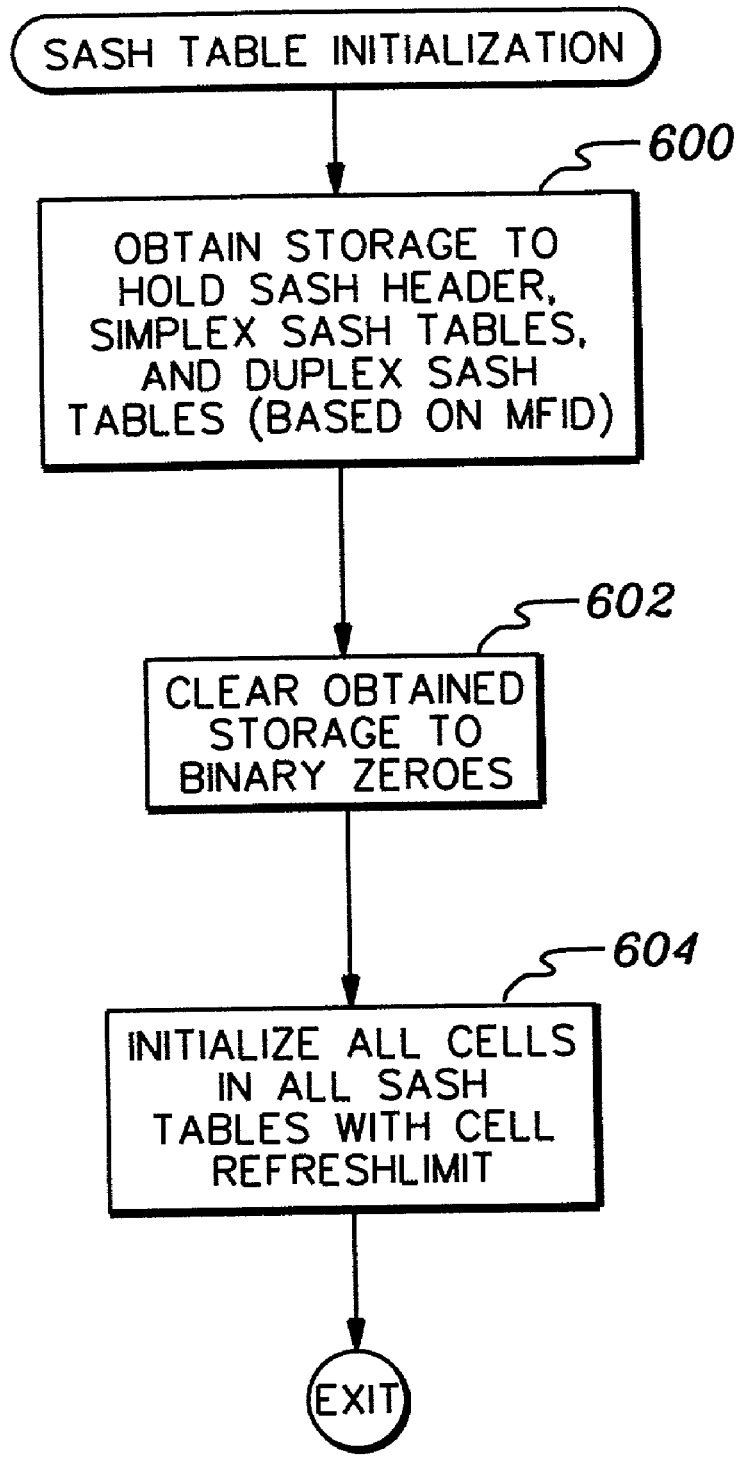
FIG. 6 depicts one embodiment of the logic associated with the initialization of the SASH tables, when the operating system is initialized, or at the time that a new coupling facility becomes accessible to the system, in accordance with an aspect of the present invention.

Referring to FIG. 6, one embodiment of the logic associated with SASH structure initialization is described. Initialization of a SASH structure is performed for each coupling facility, when that coupling facility is initialized, either at system initialization time or when a coupling facility becomes accessible subsequent to system initialization. In either case, each coupling facility is assigned its own unique MFID at that time. This MFID value can be used to determine how many duplex SASH tables are to be included in the SASH structure for this coupling facility. In one example, this is determined as:

Number of duplex *SASH* tables=(*MFID*−1)*2.

Therefore, at this time, storage is obtained for the coupling facility's SASH tables by obtaining an amount of storage equal to:

Storage Amount=Size of a *SASH* header+Size of a simplex *SASH* table+(Number of duplex *SASH* tables*Size of a duplex *SASH* table), STEP 600.

Note that the size of a simplex and duplex SASH table depends on the value of each of the three dimensions of the tables. For example, there are two opcode types (list/lock and cache), so that dimension of the table is 2. The data transfer size dimension depends on how the data sizes are "categorized", and in one implementation is 4. The opcode dimension depends on how many different coupling facility request opcodes there are, plus whatever additional pseudo-opcodes one might wish to define to accommodate "special operands" on coupling facility requests. As an example of this, some coupling facility operations have an operand called a "name mask" which, depending on the value specified, results in the operation executing quickly against a single coupling facility entry, or performing a long-running scan of the entire coupling facility structure. Obviously, the performance characteristics of these requests, which have the same actual opcode, are very different depending on the value specified for the name mask operand. To accommodate this, the actual opcode value's row is assigned in the table to come into play when the name mask designates a short-running single entry operation, and a higher pseudo-opcode row is assigned in the table to come into play when the name mask designates a long-running coupling facility structure scan. Additional space is provided in the table for these extra pseudo-opcode rows in the opcode dimension of the table.

The storage for the SASH tables is obtained from common storage accessible to all coupling facility end users, and is cleared to binary zeroes, STEP 602, effectively setting all SASH cell fields to zero in all cells in all SASH tables for this coupling facility.

Zero values for all of these fields is appropriate, except for one: the RefreshLimit 318. The RefreshLimit in each cell is set to a nonzero value, which reflects how many consecutive operations are allowed to be converted to asynchronous execution before one is forced to be performed synchronously, (if none are otherwise performed synchronously as a result of the sync/async heuristic decision-making process). Therefore, the RefreshLimit field in the cells of the SASH tables for this coupling facility are set to the desired value, STEP 604. Note that the particular value chosen is not central to the present invention, and any value could be chosen without departing from or detriment to the present invention. If a small value is chosen, that will ensure that when synchronous coupling facility request service times return to a "normal" value after having been elongated for some reason, that synchronous coupling facility requests will be "forced" often enough that this will be noticed responsively; however, if the elongated coupling facility request service times persist (perhaps indefinitely due to a static factor such as distance), then a small value will result in unnecessary overhead as coupling facility operations are "needlessly" driven synchronously, when they should really have been performed asynchronously. On the other hand, if a large value is chosen, the converse is true.

The actual value chosen reflects a tradeoff between these conflicting considerations. In one implementation, a RefreshLimit of 100 is chosen, meaning that at most 1% of (every 100th) coupling facility operation is "forced" to be performed synchronously. Note also that it is possible to initialize different cells with different values for RefreshLimit, when the SASH tables are initialized with this value; there is no requirement for all cells to contain the same RefreshLimit value.

Threshold Initialization

Figure 7:
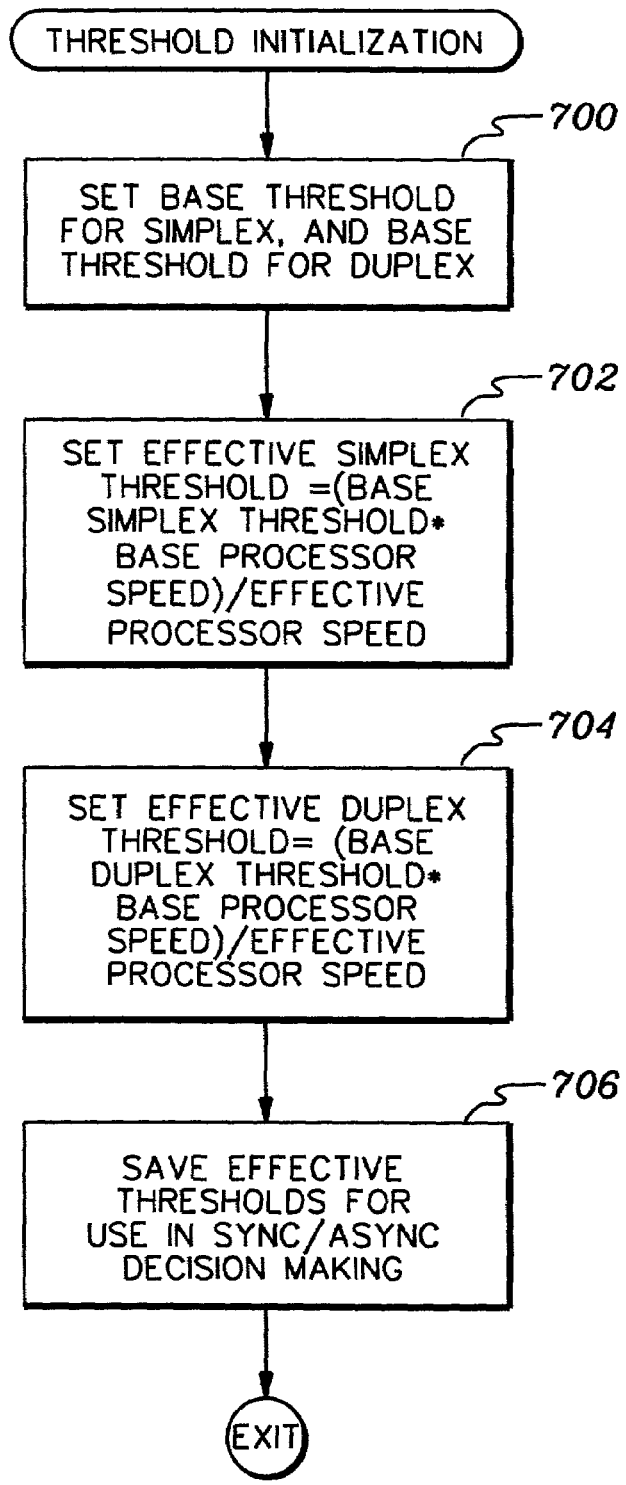
FIG. 7 depicts one embodiment of the logic associated with the initialization of the thresholds that are used in determining whether or not a particular coupling facility operation should be driven synchronously or asynchronously, in accordance with an aspect of the present invention.

One embodiment of the logic associated with the initialization of the threshold values, for both simplex and duplex requests, that are compared to a cell's MWASST value to make the sync/async conversion decision, is described with reference to FIG. 7.

These thresholds are to be carefully chosen in order for an objective of an aspect of the present invention to be met. Once again, this objective is to dynamically convert requests to asynchronous, when synchronous request service times are expected to be "long"; and to process requests synchronously, when synchronous request service times are expected to be "short", and thereby, optimize the overall system throughput and minimize the system overhead associated with a given coupling facility request workload executing under a particular set of environmental conditions.

Underlying this objective is the assumption that a coupling facility request's synchronous request service time can be traded off against an equivalent amount of processor cycles spent performing a coupling facility request asynchronously. In the synchronous case, the CPU cycles are spent waiting for the synchronous coupling facility operation to complete, for an amount of time equal to the synchronous service time; in the asynchronous case, the CPU cycles are spent in launching the operation asynchronously, observing the asynchronous completion of the operation, notifying the end user of asynchronous request completion, as well as in whatever "context switching" losses accrue to give up control of the processor, so that other work units can run while the operation runs asynchronously. If the amount of CPU cycles spent in either case is the same, then it doesn't matter whether the operation is performed synchronously or asynchronously; this is the "break-even point" that is represented via the threshold values.

In one aspect of the present invention, the threshold is represented as a service time value in microseconds. It could, equivalently, be represented as a count of equivalent instructions that correlates to that number of microseconds spent on a processor executing instructions at the rate that the operating system image's CPU is executing. This equivalence between the synchronous service time (in microseconds) and the equivalent instruction cost of launching and completing the operation asynchronously (in instruction counts, which can be normalized to microseconds of CPU time on the processor) is important in determining the threshold values.

The equivalent instruction cost of performing an asynchronous simplex and duplexed request on a particular "base" processor (executing at a particular processor speed) was measured, and it was found that the equivalent instruction costs for that processor equated to a simplex service time of 75 microseconds, and a duplexed service time of 125 microseconds. (The value is higher for duplexed requests because there is more system overhead involved in launching and completing two duplexed operations, than there is in launching and completing one simplex request). These particular values are not central to the various aspects of the present invention and could be different in other implementations, without departing from or detriment to aspects of the present invention. However, the "base" thresholds are set based on these measurements, STEP 700 (FIG. 7).

These base thresholds apply only to the particular processor, and processor speed that goes along with it, on which the measurements were made, however. On a faster processor, the same number of equivalent instructions spent processing an asynchronous request will correlate to a smaller threshold service time; conversely, on a slower processor, it will correlate to a larger threshold service time. Therefore, the "base" thresholds are adjusted accordingly for simplex, STEP 702, and duplexed requests, STEP 704, by applying the following calculation, as one example:

Effective threshold=(base threshold*base processor speed)/effective processor speed.

These effective thresholds then represent the break-even point in system overhead between synchronous and asynchronous request execution, given the actual effective speed of the processor on which the operating system image is running. These effective thresholds for simplex and duplex requests are calculated once at system initialization time, and saved for later use in the sync/async heuristic decision-making for all coupling facility requests, STEP 706.

Described in detail above is a capability that monitors the average synchronous service time associated with requests, and uses this information in real-time as input to a technique that decides whether to drive command execution synchronously or asynchronously, based on the relevant information about the coupling facility request itself, and the currently-available information regarding the performance of requests of that same type on that same coupling facility. One objective is to optimize the overall CPU consumption, throughput, and responsiveness on the issuing operating system image, given a particular coupling facility request workload.

As a side benefit, this technique may substantially improve the coupling facility request overhead associated with data sharing and coupling facility usage in a Geographically Dispersed Parallel Sysplex (GDPS) environment. In such environments, the large distances that often lie between coupling facilities and the attached operating system images that are using them tend to lead requests to be converted to asynchronous, limiting the CPU consumption for a given amount of coupling facility activity in the attached systems.

The capabilities of the present invention provide advantages over previous techniques in the area of synchronous to asynchronous request conversion. In the original coupling facility support, all coupling facility operations that were requested to be performed synchronously by the end user were, in general, performed synchronously regardless of whether this was desirable from the standpoint of overall system CPU utilization and throughput. The only exception to this rule was caused by unavailability of I/O resources, such as subchannels. If resources were not immediately available to process a synchronous request, then the request was converted to asynchronous and queued for later asynchronous execution.

Subsequently, some attempts were made to optimize coupling facility access by static, rules of thumb based sync/async request conversion. In this support, a static comparison was made between the inherent processor speed of the CPU in the operating system image versus the inherent processor speed of the CPU in the coupling facility image. If the processor in the coupling facility is inherently significantly slower than the processor in the operating system image, then it is more likely that the service time of the coupling facility request is long enough that conversion to asynchronous execution is warranted. This static mechanism also took into account the amount of data transfer requested by the coupling facility operation (the more data, the more this tends to elongate the synchronous service time), and also statically singled out certain inherently long-running coupling facility request opcodes (such as commands which scanned the entire coupling facility structure) and always converted these to asynchronous execution.

However, because the prior technique was based on static rules of thumb, it was totally unable to compensate for dynamic factors such as reacting to spikes in the coupling facility workload, coupling facility link workload, or channel subsystem workload; and it was even unable to account for such pervasive static factors as the type of links to the coupling facility (inherent link speed), the distance to the coupling facility (propagation delays), low-weighted coupling facility images using shared CPUs (which tended to get elongated service times), and the like. Aspects of the present invention overcome these deficiencies.

Although the embodiments described herein refer to coupling facility requests, aspects of the present invention are not limited to such requests. Aspects of the present invention can be used with other requests that can be executed synchronously/asynchronously.

Further, although in the embodiments described herein, duplexing refers to a pair of structures, duplexing can be extended to a plurality of structures in a plurality of coupling facilities.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing the processing of requests in a distributed computing environment, said method comprising:

obtaining a request to be processed; and determining whether the request is to be processed synchronously or asynchronously, said determining being based, at least in part, on an observed service time for at least one processed request;

wherein said request to be processed is a coupling facility request, and wherein said determining further comprises:

determining whether the coupling facility request is a simplex request or a duplex request, said duplex request comprising a request split into a plurality of requests and driven against a plurality of coupling facility structures;

locating information to be used in determining whether the coupling facility request is to be executed asynchronously or synchronously, said locating being based on whether the coupling facility request is a simplex request or a duplex request, and said information comprising actual observed average service time for one or more previously processed coupling facility requests of a similar type of the coupling facility request to be processed;

using the located actual observed average service time to determine whether the coupling facility request to be processed is to be processed asynchronously or synchronously; and processing the request synchronously or asynchronously, as determined.

2. The method of claim 1, wherein the request is a synchronous request, and said method further comprises converting the synchronous request to an asynchronous request, in response to the determining.

3. The method of claim 1, wherein said observed service time comprises an average synchronous service time associated with a plurality of processed synchronous requests.

4. The method of claim 3, wherein said average synchronous service time comprises a moving weighted average synchronous service time.

5. The method of claim 1, wherein said at least one processed request is of the same type as the request to be processed.

6. The method of claim 5, wherein the type is indicated by one or more of an opcode type, an opcode, an amount of data transfer requested on the request, and zero or more other request considerations.

7. The method of claim 1, wherein the observed service time is stored in a data structure indexed by a request type of the request to be processed.

8. The method of claim 7, wherein the request type comprises one or more of an opcode type, an opcode, an amount of data transfer requested on the request, and zero or more other request considerations.

9. The method of claim 7, wherein the data structure comprises one or more sub-data structures, each of said one or more sub-data structures comprising an observed service time, and wherein the request type is used as an index into the data structure to select the observed service time from the appropriate sub-data structure, said selected observed service time to be used in the determining.

10. The method of claim 9, wherein the request is a simplex request, and the appropriate sub-data structure comprises a selected table for simplex requests.

11. The method of claim 10, wherein the selected table is selected based on a coupling facility to process the request.

12. The method of claim 10, wherein the selected table comprises a plurality of cells including a plurality of observed service times, and wherein said method further comprises selecting, based on the request type, a cell with the observed service time to be used in the determining.

13. The method of claim 12, wherein the request type comprises one or more of an opcode type, an opcode, an amount of data transfer requested on the request, and zero or more other request considerations.

14. The method of claim 9, wherein the data structure comprises at least one pair of tables for duplexed requests, and the request is a duplex request, and wherein the appropriate sub-data structure comprises a selected table from the at least one pair of tables.

15. The method of claim 14, wherein the selected table is selected based on primary and secondary coupling facilities to process the request.

16. The method of claim 14, wherein the selected table comprises a plurality of cells including a plurality of observed service times, and wherein said method further comprises selecting, based on request type, a cell with the observed service time to be used in the determining.

17. The method of claim 16, wherein the request type comprises one or more of an opcode type, an opcode, an amount of data transfer requested on the request, and zero or more other request considerations.

18. The method of claim 7, wherein the request is a coupling facility request, and wherein the data structure is associated with a coupling facility to process the coupling facility request.

19. The method of claim 1, wherein said request comprises one of a coupling facility cache request, a coupling facility list request and a coupling facility lock request.

20. The method of claim 1, wherein the using comprises determining whether an expected service time of the coupling facility request to be processed is above a threshold value, wherein if the expected service time is less than the threshold value, then the coupling facility request is processed synchronously, and, if the expected service time is greater than or equal to the threshold value, then the coupling facility request is processed asynchronously, and wherein the threshold value is determined by multiplying a base threshold with a base processor speed to obtain a value and then dividing that value by an effective processor speed.

21. The method of claim 1, wherein said determining comprises determining, in real-time, whether the request is to be processed synchronously or asynchronously.

22. The method of claim 1, further comprising forcing the request to be performed synchronously even though the determining indicates that the request is to be performed asynchronously.

23. The method of claim 22, wherein the forcing is performed, in response to a selected number of requests of the type of the request having been processed asynchronously.

24. The method of claim 1, wherein the observed service time comprises a moving weighted average synchronous service time, and wherein said method further comprises computing the observed moving weighted average synchronous service time.

25. The method of claim 24, wherein said computing comprises performing the following for each of the at least one processed request:

determining an amount of time to process the processed request; and calculating the observed moving weighted average synchronous service time using the determined amount of time.

26. The method of claim 1, wherein said determining comprises:

comparing the observed service time to a threshold value; and selecting synchronous or asynchronous processing based, at least in part, on the comparison.

27. The method of claim 26, further comprising computing said threshold value, said computing using one or more inputs, at least one input of said one or more inputs relating to processor speed.

28. The method of claim 26, further comprising computing said threshold value, said computing using one or more inputs, at least one input of said one or more inputs relating to a cost of asynchronous processing of a request.

29. A system of managing the processing of requests in a distributed computing environment, said system comprising:
   means for obtaining a request to be processed; and
   means for determining whether the request is to be processed synchronously or asynchronously, said determining being based, at least in part, on an observed service time for at least one processed request;
   wherein said request to be processed is a coupling facility request, and wherein said means for determining further comprises:
      means for determining whether the coupling facility request is a simplex request or a duplex request, said duplex request comprising a request split into a plurality of requests and driven against a plurality of coupling facility structures;
      means for locating information to be used in determining whether the coupling facility request is to be executed asynchronously or synchronously, said locating being based on whether the coupling facility request is a simplex request or a duplex request, and said information comprising actual observed average service time for one or more previously processed coupling facility requests of a similar type of the coupling facility request to be processed;
      means for using the located actual observed average service time to determine whether the coupling facility request to be processed is to be processed asynchronously or synchronously; and
   means for processing the request synchronously or asynchronously, as determined.

30. The system of claim 29, wherein the request is a synchronous request, and said system further comprises means for converting the synchronous request to an asynchronous request, in response to the determining.

31. The system of claim 29, wherein said observed service time comprises an average synchronous service time associated with a plurality of processed synchronous requests.

32. The system of claim 31, wherein said average synchronous service time comprises a moving weighted average synchronous service time.

33. The system of claim 29, wherein said at least one processed request is of the same type as the request to be processed.

34. The system of claim 33, wherein the type is indicated by one or more of an opcode type, an opcode, an amount of data transfer requested on the request, and zero or more other request considerations.

35. The system of claim 29, wherein the observed service time is stored in a data structure indexed by a request type of the request to be processed.

36. The system of claim 35, wherein the request type comprises one or more of an opcode type, an opcode, an amount of data transfer requested on the request and zero or more other request considerations.

37. The system of claim 35, wherein the data structure comprises one or more sub-data structures, each of said one or more sub-data structures comprising an observed service time, and wherein the request type is used as an index into the data structure to select the observed service time from the appropriate sub-data structure, said selected observed service time to be used in the determining.

38. The system of claim 37, wherein the request is a simplex request, and the appropriate sub-data structure comprises a selected table for simplex requests.

39. The system of claim 38, wherein the selected table is selected based on a coupling facility to process the request.

40. The system of claim 38, wherein the selected table comprises a plurality of cells including a plurality of observed service times, and wherein said system further comprises selecting, based on the request type, a cell with the observed service time to be used in the determining.

41. The system of claim 40, wherein the request type comprises one or more of an opcode type, an opcode, an amount of data transfer requested on the request and zero or more other request considerations.

42. The system of claim 37, wherein the data structure comprises at least one pair of tables for duplexed requests, and the request is a duplex request, and wherein the appropriate sub-data structure comprises a selected table from the at least one pair of tables.

43. The system of claim 42, wherein the selected table is selected based on primary and secondary coupling facilities to process the request.

44. The system of claim 42, wherein the selected table comprises a plurality of cells including a plurality of observed service times, and wherein said system further comprises selecting, based on request type, a cell with the observed service time to be used in the determining.

45. The system of claim 44, wherein the request type comprises one or more of an opcode type, an opcode, an amount of data transfer requested on the request, and zero or more other request considerations.

46. The system of claim 35, wherein the request is a coupling facility request, and wherein the data structure is associated with a coupling facility to process the coupling facility request.

47. The system of claim 29, wherein said request comprises one of a coupling facility cache request, a coupling facility list request and a coupling facility lock request.

48. The system of claim 29, wherein the means for using comprises means for determining whether an expected service time of the coupling facility request to be processed is above a threshold value, wherein if the expected service time is less than the threshold value, ten the coupling facility request is processed synchronously, and, if the expected service time is greater tan or equal to the threshold value, then the coupling facility request is processed asynchronously, and wherein the threshold value is determined by multiplying a base threshold with a base processor speed to obtain a value and then dividing that value by an effective processor speed.

49. The system of claim 29, wherein said means for determining comprises means for determining, in real-time, whether the request is to be processed synchronously or asynchronously.

50. The system of claim 29, further comprising means for forcing the request to be performed synchronously even though the determining indicates that the request is to be performed asynchronously.

51. The system of claim 50, wherein the forcing is performed, in response to a selected number of requests of the type of the request having been processed asynchronously.

52. The system of claim 29, wherein the observed service time comprises a moving weighted average synchronous service time, and wherein said system further comprises means for computing the observed moving weighted average synchronous service time.

53. The system of claim 52, wherein said means for computing comprises means for performing the following for each of the at least one processed request:
  determining an amount of time to process the processed request; and
  calculating the observed moving weighted average synchronous service time using the determined amount of time.

54. The system of claim 29, wherein said means for determining comprises:
  means for comparing the observed service time to a threshold value; and
  means for selecting synchronous or asynchronous processing based, at least in part, on the comparison.

55. The system of claim 54, further comprising means for computing said threshold value, said computing using one or more inputs, at least one input of said one or more inputs relating to processor speed.

56. The system of claim 54, further comprising means for computing said threshold value, said computing using one or more inputs, at least one input of said one or more inputs relating to a cost of asynchronous processing of a request.

57. At lest one program storage readable by a machine having storage thereon at least one program of institutions executable by the machine to perform a method of managing the processing of request in a distributed computing environment, said method comprising:
  obtaining a request to be processed; and
  determining whether the request is to be processed synchronously or asynchronously, said determining being based, at least in part, on an observed service time for at least one processed request;
  wherein said request to be processed is a coupling facility request, and wherein said determining further comprises:
    determining whether the coupling facility request is a simplex request or a duplex request, said duplex request comprising a request split into a plurality of requests and driven against a plurality of coupling facility structures;
    locating information to be used in determining whether the coupling facility request is to be executed asynchronously or synchronously, said locating being based on whether the coupling facility request is a simplex request or a duplex request, and said information comprising actual observed average service time for one or more previously processed coupling facility requests of a similar type of the coupling facility request to be processed;
    using the located actual observed average service time to determine whether the coupling facility request to be processed is to be processed asynchronously or synchronously; and
    processing the request synchronously or asynchronously, as determined.

58. The at least one program storage device of claim 57, wherein the request is a synchronous request, and said method further comprises convening the synchronous request to an asynchronous request, in response to the determining.

59. The at least one program storage device of claim 57, wherein said observed service time comprises an average synchronous service time associated with a plurality of processed synchronous requests.

60. The at least one program storage device of claim 59, wherein said average synchronous service time comprises a moving weighted average synchronous service time.

61. The at least one program storage device of claim 57, wherein said at least one processed request is of the same type as the request to be processed.

62. The at least one program storage device of claim 61, wherein the type is indicated by one or more of an opcode type, an opcode, an amount of data transfer requested on the request, and zero or more other request considerations.

63. The at least one program storage device of claim 57, wherein the observed service time is stored in a data structure indexed by a request type of the request to be processed.

64. The at least one program storage device of claim 63, wherein the request type comprises one or more of an opcode type, an opcode, an amount of data transfer requested on the request, and zero or more other request considerations.

65. The at least one program storage device of claim 63, wherein the data structure comprises one or more sub-data structures, each of said one or more sub-data structures comprising an observed service time, and wherein the request type is used as an index into the data structure to select the observed service time from the appropriate sub-data structure, said selected observed service time to be used in the determining.

66. The at least one program storage device of claim 65, wherein the request is a simplex request, and the appropriate sub-data structure comprises a selected table for simplex requests.

67. The at least one program storage device of claim 66, wherein the selected table is selected based on a coupling facility to process the request.

68. The at least one program storage device of claim 66, wherein the selected table comprises a plurality of cells including a plurality of observed service times, and wherein said method further comprises selecting, based on the request type, a cell with the observed service time to be used in the determining.

69. The at least one program storage device of claim 68, wherein the request type comprises one or more of an opcode type, an opcode, an amount of data transfer requested on the request, and zero or more other request considerations.

70. The at least one program storage device of claim 65, wherein the data structure comprises at least one pair of tables for duplexed requests, and the request is a duplex request, and wherein the appropriate sub-data structure comprises a selected table from the at least one pair of tables.

71. The at least one program storage device of claim 70, wherein the selected table is selected based on primary and secondary coupling facilities to process the request.

72. The at least one program storage device of claim 70, wherein the selected table comprises a plurality of cells including a plurality of observed service times, and wherein said method further comprises selecting, based on request type, a cell with the observed service time to be used in the determining.

73. The at least one program storage device of claim 72, wherein the request type comprises one or more of an opcode type, an opcode, an amount of data transfer requested on the request, and zero or more other request considerations.

74. The at least one program storage device of claim 63, wherein the request is a coupling facility request, and wherein the data structure is associated with a coupling facility to process the coupling facility request.

75. The at least one program storage device of claim 57, wherein said request comprises one of a coupling facility cache request, a coupling facility list request and a coupling facility lock request.

76. The at least one program storage device of claim 57, wherein the using comprises determining whether an expected service time of the coupling facility request to be processed is above a threshold value, wherein if the expected service time is less than the threshold value, then the coupling facility request is processed synchronously, and, if the expected service time is greater than or equal to the threshold value, then the coupling facility request is processed asynchronously, and wherein the threshold value is determined by multiplying a base threshold with a base processor speed to obtain a value and then dividing that value by an effective processor speed.

77. The at least one program storage device of claim 57, wherein said determining comprises determining, in real-time, whether the request is to be processed synchronously or asynchronously.

78. The at least one program storage device of claim 57, further comprising forcing the request to be performed synchronously even though the determining indicates that the request is to be performed asynchronously.

79. The at least one program storage device of claim 78, wherein the forcing is performed, in response to a selected number of requests of the type of the request having been processed asynchronously.

80. The at least one program storage device of claim 57, wherein the observed service time comprises a moving weighted average synchronous service time, and wherein said method further comprises computing the observed moving weighted average synchronous service time.

81. The at least one program storage device of claim 80, wherein said computing comprises performing the following for each of the at least one processed request:

determining an amount of time to process the processed request; and calculating the observed moving weighted average synchronous service time using the determined amount of time.

82. The at least one program storage device of claim 57, wherein said determining comprises:

comparing the observed service time to a threshold value; and selecting synchronous or asynchronous processing based, at least in part, on the comparison.

83. The at least one program storage device of claim 82, further comprising computing said threshold value, said computing using one or more inputs, at least one input of said one or more inputs relating to processor speed.

84. The at least one program storage device of claim 82, further comprising computing said threshold value, said computing using one or more inputs, at least one input of said one or more inputs relating to a cost of asynchronous processing of a request.

* * * * *

UNITED STATES PATENT AND TRADEMARK OFFICE
CERTIFICATE OF CORRECTION

| | |
|---|---|
| PATENT NO. | : 7,099,935 B2 |
| APPLICATION NO. | : 09/968185 |
| DATED | : August 29, 2006 |
| INVENTOR(S) | : Jordan et al. |

It is certified that error appears in the above-identified patent and that said Letters Patent is hereby corrected as shown below:

Claim 57

Col. 25, line 29, delete the word "institutions" and insert the word --instructions--

Col. 25, line 31, delete the word "request" and insert the word --requests--

Claim 58

Col. 25, line 63, delete the word "convening" and insert the word --converting--

Signed and Sealed this

Twelfth Day of December, 2006

JON W. DUDAS
*Director of the United States Patent and Trademark Office*